United States Patent
Carnevali

(10) Patent No.: US 7,464,813 B2
(45) Date of Patent: *Dec. 16, 2008

(54) DRY BOX WITH MAGNIFICATION WINDOW AND PUNCH-OUT

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 480 days.

This patent is subject to a terminal disclaimer.

(21) Appl. No.: 11/046,353

(22) Filed: Jan. 28, 2005

(65) Prior Publication Data

US 2006/0169607 A1   Aug. 3, 2006

(51) Int. Cl.
- B65D 85/20 (2006.01)
- A47B 797/00 (2006.01)
- H05K 5/02 (2006.01)
- H05K 5/06 (2006.01)
- H05K 7/16 (2006.01)
- H04B 1/38 (2006.01)
- H04M 1/04 (2006.01)

(52) U.S. Cl. .................. 206/320; 312/223.1; 361/724; 361/727; 455/90.3; 455/575.4; 455/575.8

(58) Field of Classification Search ................. 206/305, 206/320; 361/679–686, 724, 727; 312/223.1–223.6; 455/556.1–558, 90.3, 575.1, 575.4, 575.8
See application file for complete search history.

(56) References Cited

U.S. PATENT DOCUMENTS

| 3,140,883 A | 7/1964 | Anthony |
| 3,972,459 A | 8/1976 | Cooper |
| 3,978,830 A | 9/1976 | Toth, Jr. |
| 4,298,204 A | 11/1981 | Jinkins |
| 4,828,558 A | 5/1989 | Kelman |
| 4,848,319 A | 7/1989 | Appeldorn |
| 5,295,602 A | 3/1994 | Swanson |
| 5,641,065 A | 6/1997 | Owens et al. |
| 5,813,096 A | 9/1998 | Soennichsen |
| 5,845,885 A | 12/1998 | Carnevali |
| 5,953,795 A | 9/1999 | Bauer |
| 5,969,057 A | 10/1999 | Schoeley et al. |
| 6,009,601 A | 1/2000 | Kaufman |
| 6,032,910 A | 3/2000 | Richter |
| 6,035,800 A | 3/2000 | Clifford |
| 6,273,773 B1 | 8/2001 | Bourke |

(Continued)

OTHER PUBLICATIONS

Otterbox Product directory, 20 pages of product description of Otter Box waterproof boxes retrieved from web site at: www.otterbox.com.

(Continued)

Primary Examiner—Bryon P Gehman
(74) Attorney, Agent, or Firm—Charles J. Rupnick, Attorney at Law

(57) ABSTRACT

A dry storage box formed of a pair of covers, a first one of the covers having structure for securing a normally handheld portable electronic device therein with a display and a control key pad of the electronic device facing toward an opening in the first cover; and a second one of the covers having an optical magnification mechanism positioned for viewing an interior portion of the first cover there through; and a latch mechanism for securing the second cover relative to the opening in the first cover with the magnification mechanism in a viewing relationship with the opening in the first cover.

20 Claims, 16 Drawing Sheets

U.S. PATENT DOCUMENTS

| | | | | |
|---|---|---|---|---|
| 6,313,982 B1 * | 11/2001 | Hino | | 361/679 |
| 6,317,313 B1 * | 11/2001 | Mosgrove et al. | | 361/680 |
| 6,347,796 B1 * | 2/2002 | Grossman et al. | | 206/320 |
| 6,407,860 B1 | 6/2002 | Funazaki et al. | | |
| 6,614,423 B1 | 9/2003 | Wong et al. | | |
| 6,646,864 B2 | 11/2003 | Richardson | | |
| 6,995,976 B2 * | 2/2006 | Richardson | | 361/681 |
| 7,023,692 B2 * | 4/2006 | Mansutti et al. | | 361/683 |
| 7,158,376 B2 * | 1/2007 | Richardson et al. | | 361/683 |
| 7,230,823 B2 * | 6/2007 | Richardson et al. | | 361/683 |
| 2004/0204204 A1 * | 10/2004 | Brilliant et al. | | 455/575.1 |

OTHER PUBLICATIONS

Otter Products, LLC, Bldg. 1 Old-Town Square, Suite 303, Fort Collins, CO 80524 Phone: 1-888-695-8820, 970-493-8446, Facsimile 1-888-695-8827, 970-493-1755.

Officeonthego.com, 3 pages of product description of Magnifico ® Plus screen magnifier product information retrieved from web site at: www.officeonthego.com.

* cited by examiner

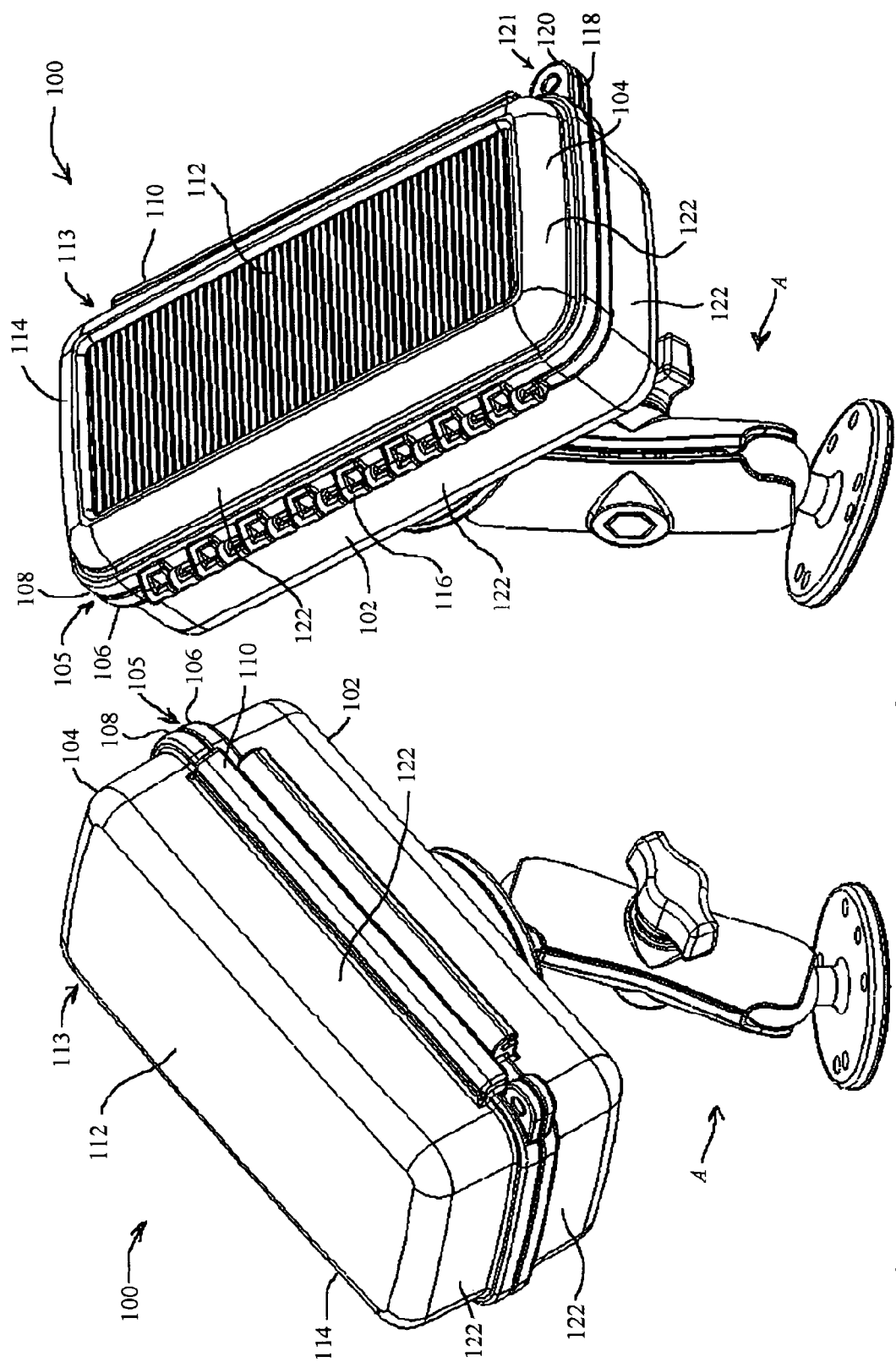

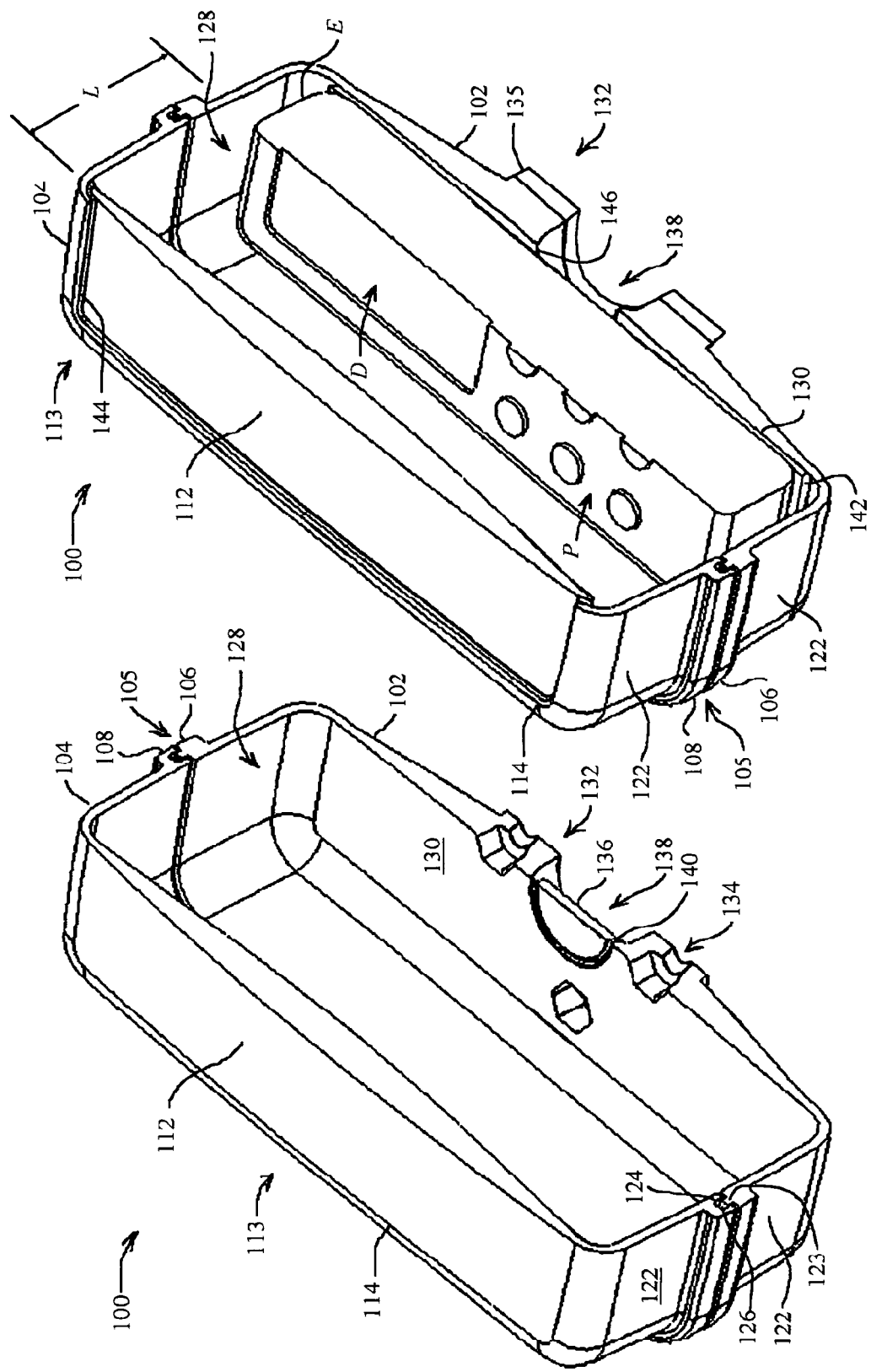

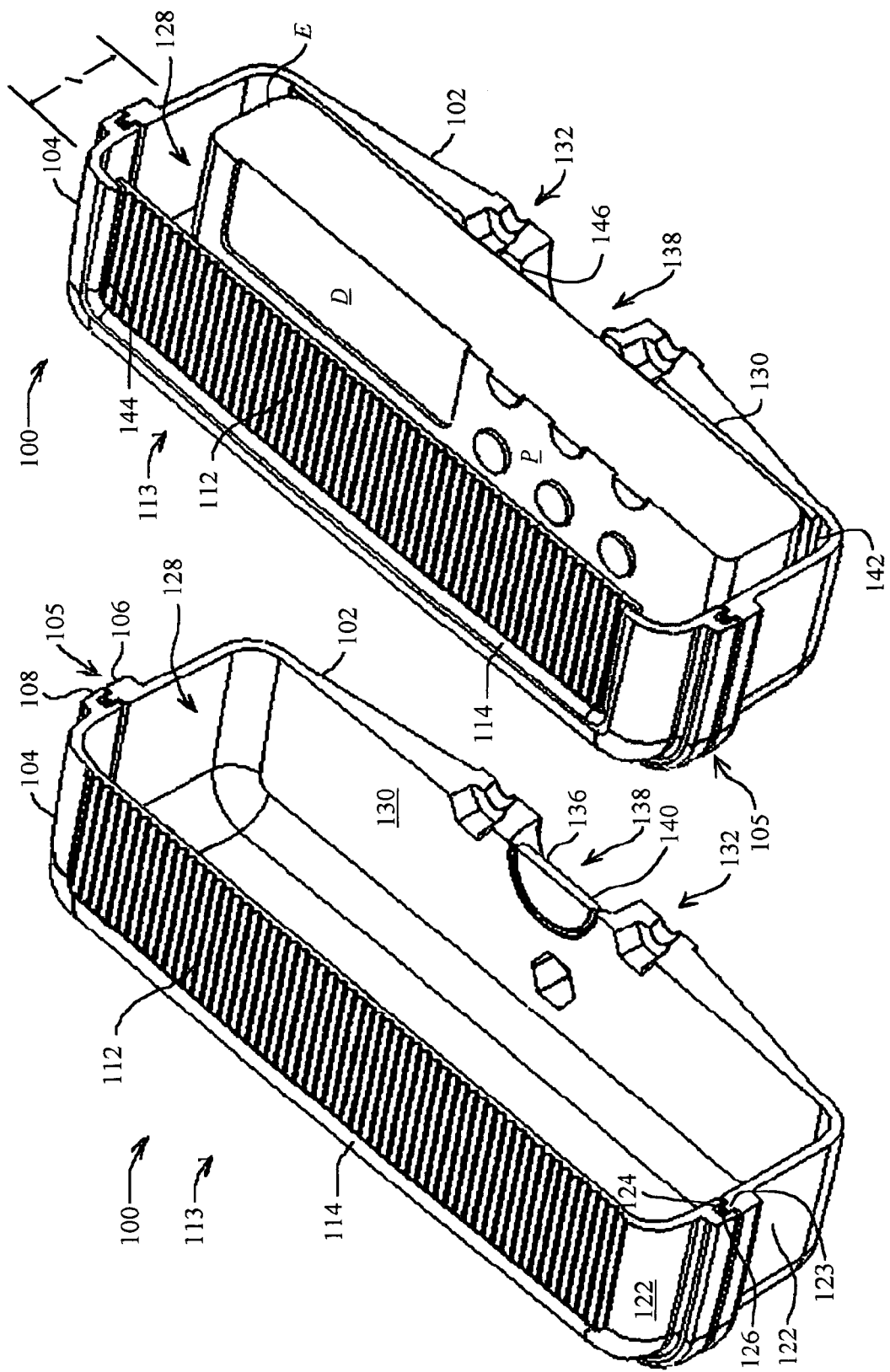

DRY BOX WITH MAGNIFICATION WINDOW AND PUNCH-OUT

This application is related to co-pending U.S. patent application Ser. No. 11/046,567 entitled, "DRY BOX WITH SEALED WINDOW" filed in the name of the same inventor on the same day herewith, and is also related to co-pending U.S. patent application Ser. No. 11/046,463 entitled, "MAGNIFICATION MECHANISM FOR VIEWING AN ELECTRONIC DISPLAY" also filed in the name of the same inventor on the same day herewith.

FIELD OF THE INVENTION

The present invention relates to a dry storage box, and in particular to a dry storage box having an optical magnification mechanism for viewing a device mounted within the box.

BACKGROUND OF THE INVENTION

Dry storage boxes are generally well know, as disclosed by Clifford in U.S. Pat. No. 6,035,800, "Gunwale Attachable Dry Box for Small Watercraft" issued Mar. 14, 2000, which is incorporated herein by reference, describes a dry storage box having a clamping device for attaching to the gunwale of a small watercraft, and by Bourke in U.S. Pat. No. 6,273,773, "Scuba Diver's Marker Buoy and Dry Box" issued Aug. 14, 2001, which is incorporated herein by reference, describes a combination dive buoy and dry box assembly, wherein the dry box provides water tight storage compartment with a hinged lid and latches for storing miscellaneous personal valuables and belongings so that, in the event of capsize, the clamped water tight dry box is sealed and valuables and belongings remain safe and dry.

Richardson describes another dry storage box in U.S. Pat. No. 6,646,864, "Protective Case for Touch Screen Device" issued Nov. 11, 2003, which is incorporated herein by reference, as a protective case for an electronic device that has a touch screen, wherein the protective case has a membrane adapted to the specific contour and profile of the electronic device that allows the user to use the touch screen interface. The protective case taught by Richardson also allows infrared and other communication signals while the device is secured inside the case. Electrical connections can also be made through the case.

SUMMARY OF THE INVENTION

The present invention is a dry storage box formed of an open substantially rectangular container having structure therein for securing a normally handheld portable electronic device adjacent to a floor thereof with the device's display and control key pad facing toward an opening in the container, a lid having an optical magnifying lens positioned for viewing an interior portion of the container there through and being structured for sealing the container opening, the container and lid being mutually hinged along corresponding edges, and a latch mechanism for securing the lid in a substantially water-resistant sealed relationship with the container opening and the magnifying lens in a viewing relationship with the display of the electronic device.

According to one aspect of the invention, the magnifying lens is movable relative to a window aperture formed in the lid, the magnifying lens being optionally either slidable relative to the window aperture, or rotatable away from the window aperture.

According to another aspect of the invention, the magnifying lens is a conventional convex lens, a Fresnel lens, or another magnifying lens capable of magnifying the display of the electronic device.

According to another aspect of the invention, the magnifying lens is smaller than the window aperture, and an optically normal viewing panel without significant magnification is sealed in the window aperture with a substantially water-resistant sealing mechanism.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view of a dry storage box, or "dry box," of the invention, wherein the dry box includes a magnifier in a lid portion of the dry box for easier viewing of a normally handheld portable electronic device secured within the dry box, and wherein the dry box is presented on a known universally positionable ball-and-socket mounting apparatus;

FIG. 2 is a perspective view of the dry box of the invention wherein the lid having the magnifier is shown hinged along an edge of the container;

FIG. 3 is a cross-sectional perspective view through the dry box of the invention wherein the magnifier is shown as a single transparent conventional convex lens and is illustrated as substantially covering at least a portion of the floor of the lid;

FIG. 4 is another cross-sectional perspective view that illustrates the use of the dry box of the invention wherein a normally handheld portable electronic device is secured adjacent the dry box floor with its display and control key pad facing toward an opening in the dry box and positioned for magnification by the magnifier when the lid is closed;

FIG. 5 is another cross-sectional perspective view through the dry box of the invention wherein the magnifier is shown as the conventional transparent Fresnel magnifying lens and is illustrated as being integral with the floor of the lid;

FIG. 6 is another cross-sectional perspective view through the dry box of the invention wherein the magnifier is shown as the conventional transparent Fresnel magnifying lens and is illustrated as being separate from the floor of the lid;

DETAILED DESCRIPTION OF PREFERRED EMBODIMENT

Figure 7:
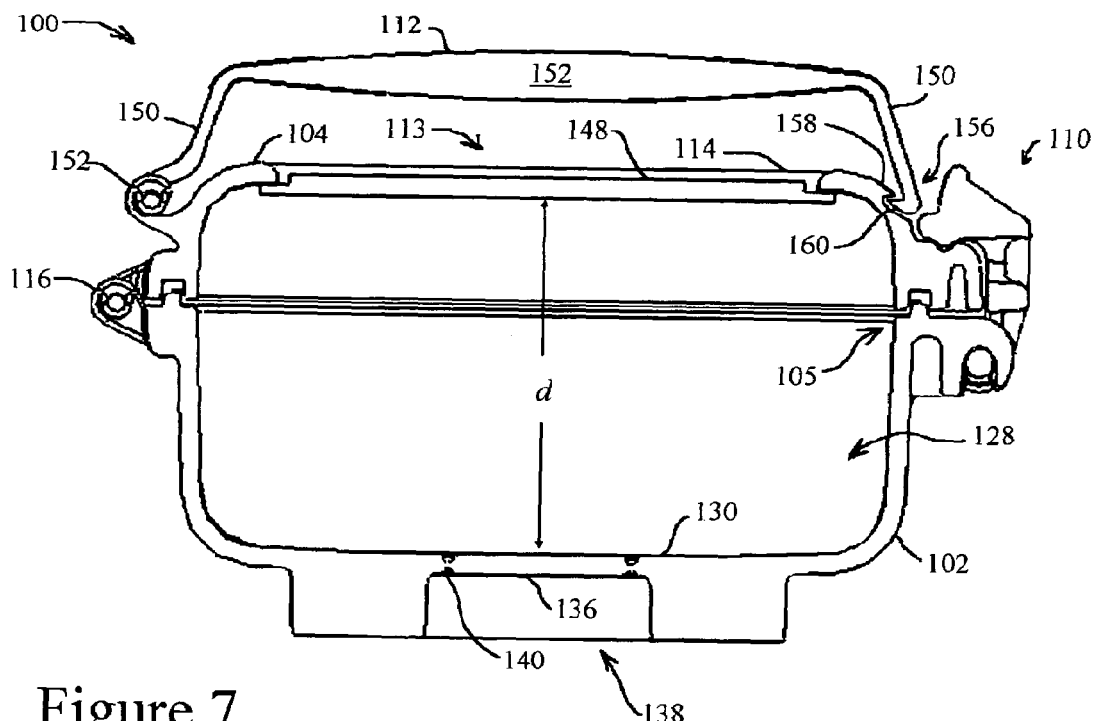
FIG. 7 is a cross-sectional end view of another embodiment of the dry box of the invention having a non-magnified normal viewing transparent panel in the window formed in the floor of the lid with the magnifier spaced there above on a hinge.

In the Figures, like numerals indicate like elements.

FIG. 1 is a perspective view of a dry storage box, or "dry box," 100 according to one embodiment of the invention, wherein the dry box 100 is presented on a universally positionable ball-and-socket mounting apparatus A of the type disclosed by Carnevali in U.S. Pat. No. 5,845,885, entitled "Universally Positionable Mounting Device," issued to Jeffrey D. Carnevali on Dec. 8, 1998, which is incorporated herein by reference, which is generally well known to be very effective for universally positioning and immovably supporting an otherwise relatively movable object in a substantially infinite variety of combinations of fixed angular and spatial relations to a relatively stationary object or mounting surface, with the ball-and-socket mounting apparatus oriented at variable angular orientations with respect to either or both of the supported and relatively stationary objects. Alternatively, the dry box 100 of the invention is presented on a belt clip for holding on a person's belt.

The dry box 100 is generally of a type well-known in the art and generally includes a pair of mutually hinged top and bottom covers 102, 104, hereinafter a "container" 102 and "lid" 104. The container 102 is, by example and without limitation, a substantially rectangular open box with the similarly shaped sealing lid 104 hinged thereto. The container 102 and lid 104 are both constructed of light weight, substantially rigid, water-resistant material, such as heavy gauge injection-moldable plastic or another suitable material, such as metal, and may be designed for rugged industrial use, recreational use, commercial use, or many other uses. Alternatively, one or both the container 102 and lid 104 are formed of a resiliently pliable material, such as a flexible rubber, for an application in a wet environment. The container 102 and lid 104 are mutually structured for creating a substantially water-resistant circumferential seal mechanism 105 between respective peripheral lip portions 106, 108 formed around their respective openings. The substantially water-resistant circumferential seal mechanism 105 is, by example and without limitation, a gasketed seal of the type disclosed by Jinkins in U.S. Pat. No. 4,298,204, "Seal" issued Nov. 3, 1981, which is incorporated herein by reference. A latch mechanism 110 secures the lid 104 in a substantially water-resistant sealed relationship with the container 102. According to one embodiment of the invention, the latch mechanism 110 is an elastic cam-over latch mechanism. Such latch mechanisms are generally well-known and include, by example and without limitation, a snap latch closure of the type disclosed by Swanson in U.S. Pat. No. 5,295,602, "Housing With Snap Latch Closure" issued Mar. 22, 1994, and the pivoting clasp disclosed by Owens, et al. in U.S. Pat. No. 5,641,065, "Medical Instrument Soaking, Transporting and Storage Container" issued Jun. 24, 1997, both incorporated herein by reference.

The lid 104 includes an optical magnification mechanism or magnifier 112 that, when the lid 104 is closed relative to the container 102, is positioned behind an opening or window aperture 113 that is positioned and structured for viewing an interior portion of the container 104 there through. The window aperture 113 is just as easily formed in the container 102 with the magnifier 112 positioned there behind, so that the roles of the two covers 102, 104 are reversed, and the window aperture 113 is positioned and structured for viewing an interior portion of the lid 104. In one example, the window aperture 113 is formed in a plate or floor portion 114 of the lid 104, and the magnifier 112 is positioned in the window aperture 113 for enlarging the appearance of a display portion D of a normally handheld portable electronic device E (shown in FIG. 4 and subsequent figures). For example, the portable electronic device E is a GPS (Global Positioning System) receiver, a portable radio or cellular telephone, a personal digital assistant (PDA), a pocket personal computer (pocket PC), a mobile presentation system (MPS) player, a MP3 player, or another handheld portable electronic device. The portable electronic device E is secured within the container 102 with its display D and a control key pad P facing up within the container 102 toward the window aperture 113 in the lid 104. The display D, and optionally the control key pad P, of the portable electronic device E is viewable through the window aperture 113, and the view is enlarged by the magnifier 112. According to one embodiment of the invention, the magnifier 112 is a single optically transparent conventional convex lens of a type well-known in the art. By example and without limitation, the magnifier 112 is formed of glass, acrylic, plastic, or polycarbonate, or anther transparent material to have a focal length structured for focusing on the display of the electronic device secured within the container 102 when the lid 104 is closed there over.

FIG. 2 is a perspective view of the dry box 100 wherein the lid 104 is shown hinged with the container 102 along corresponding edges of their respective lip portions 106, 108. By example and without limitation, the container 102 and lid 104 are hinged by a conventional lid hinge 116 of a type well-known in the art. The magnifier 112 provided at the lid 104 is an optically transparent Fresnel lens of a type well-known in the art. See, for example, U.S. Pat. No. 6,407,860, "Fresnel Lens Sheet." By example and without limitation, the Fresnel lens magnifier 112 formed of a plastic or polycarbonate material to have a focal length structured for focusing on the display of the electronic device secured within the container 102 when the lid 104 is closed there over.

A pair of mating eyelets 118, 120 are optionally provided on the respective lip portions 106, 108 adjacent to the latch mechanism 110. The mating eyelets 118, 120 come together when the lid 104 is close relative to the container 102 and form a ring 121 for receiving the shackle of a padlock for securing the contents of the dry box 100 against theft. Alternatively, the ring 121 receives a lanyard or wrist strap for maintaining a hold on the dry box 100 and its contents.

Alternatively, the Fresnel lens magnifier 112 formed of a thin resiliently pliable membrane that operates magnify the appearance of both the display D and control key pad P of the electronic device E. For example, the Fresnel lens magnifier 112 is a sheet of flexible magnifying plastic of a type that is well-known in the art. See, for example, U.S. Pat. No. 3,140,883, "Book Cover" issued to Anthony on Oct. 23, 1962, which is incorporated herein by reference. See, also, U.S. Pat. No. 4,828,558, "Laminate Optic with Interior Fresnel Lens" issued to Kelman on May 9, 1989, and U.S. Pat. No. 4,848,319, "Refracting Solar Energy Concentrator and Thin Flexible Fresnel Lens" issued to Appeldorn on Jul. 18, 1989, which are both incorporated herein by reference. The Fresnel lens magnifier 112 is thus made substantially flexible so that, when the Fresnel lens magnifier 112 is in close proximity to or even in direct contact with the electronic device E, substantially normal finger pressure is effective for communicating tactile inputs to the electronic device E, i.e., depressing the keys of the control key pad P.

FIG. 3 is a cross-sectional perspective view through the dry box 100. The magnifier 112 is shown as the single transparent conventional convex lens and is illustrated as substantially covering at least a portion of the floor 114 of the lid 104. According to one embodiment of the invention, the magnifier 112 is initially separate from the lid 104, and the lid 104 is molded onto the magnifier 112 during an injection molding process in which the lid 104 is formed. Alternatively, the magnifier 112 is formed integrally with the lid 104 with both the lid 104 and magnifier 112 being formed of the transparent plastic, polycarbonate, or other material of which the magnifier 112 is formed. As such, one or more sides 122 of the container 102 or lid 104 may be transparent, whereby information, such as indicator lights for power, communication, battery status, or other functions located on any of the sides of the of the device E may be viewable through one or more of the container or lid sides 122.

The substantially water-resistant circumferential seal 105 along respective peripheral lip portions 106, 108 around the openings of the respective container 102 and lid 104 is illustrated, by example and without limitation, as a circumferential projection or tongue 123 formed in the peripheral lip 106 of the container 102 and a mating circumferential groove or channel 124 formed in the peripheral lip 108 of the lid 104, the channel 124 is sized to receive the tongue 123. A gasket 126 of a resiliently deformable material, such as rubber, silicone, or closed-cell foam, is positioned at least partially within the channel 124 and is sized to cooperate with the tongue 123 and channel 124 so that the tongue 123 contacts and partially deforms the gasket 126 when the lid 104 is closed relative to the container 102 with the latch mechanism 110 engaged.

An interior cavity 128 of the container 102 is sized to receive and contain one or more different normally handheld portable electronic device adjacent a floor 130 thereof. Additionally, the container floor 130 includes receiver structure 132 for securing the container 102 to an external presentation apparatus, such as the universally positionable ball-and-socket mounting apparatus A of the type illustrated in FIG. 1, a belt clip for holding the dry box 100 on a person's belt, or another presentation apparatus. For example, the container floor 130 is pierced with one or more apertures 134 each structured to receive a conventional fastener. Alternatively, the structure 132 is a simple planar surface structured to receive a resilient adhesive pad 135 of the type commonly known as a Pressure Sensitive Adhesive or PSA. Other conventional receiver structures 132 are also contemplated and can be substituted without deviating from the scope and intent of the present invention.

Occasionally, it is desirable to connect the portable electronic device to an external antenna or power source. Accordingly, the container floor 130 optionally includes a knock-out plug 136 that, when removed, leaves an aperture sized to admit a wire, plug or wiring harness there through so that direct electrical connections to be made electronic device E without having to open the lid 104. The aperture left by removal of the plug 136 also provides a pass-through for light, acoustics, heat, mechanical actuation, and other forms of communication with the device E. The knock-out plug 136 is placed at the bottom of a well 138 and includes a groove 140 formed thereabout that locally thins the floor 130 and permits a user to punch out the knock-out plug 136 with thumb pressure or a light hammer and leaves an edge that is harmless to insulated wires.

Further, the glass, acrylic, plastic, or polycarbonate, or other transparent material of magnifier 112 allows infrared and other types of communication signals between the electronic device E inside the case and an external electronic device while the device E is maintained in the protective dry box 100.

FIG. 4 is another cross-sectional perspective view through the dry box 100 that shows the normally handheld portable electronic device E secured adjacent the container floor 130 with its display D and control key pad P facing toward an opening in the container 102 and positioned for magnification by the magnifier 112 when the lid 104 is closed. FIG. 4 therefore illustrates the use of the dry box 100 of the invention.

According to one embodiment of the invention, the portable electronic device E is located relative to the window aperture 113 and is secured adjacent the container floor 130 by a resilient adhesive pad 142 commonly known as a Pressure Sensitive Adhesive or PSA. Other suitable means for removably or permanently securing the portable electronic device E are considered equivalent and are also within the scope of the claimed invention. For example, snap-in clips may be molded in the container 104 for securing the portable electronic device E, or a custom bracket, or a fastener, or a hook and loop fastener system, or even foam pads having cut-out or molded features sized to accept different portable electronic devices of different sizes and shapes. Different means for locating and securing the portable electronic device E can be provided in the container 104 without deviating from the scope and intent of the present invention.

The container 102 and lid 104 are sized compatibly with the portable electronic device E to ensure the magnifier 112 is spaced a distance L from the display D, whereby the magnifier 112 is both focused on the display D and provides significant magnification of the display D when the dry box 100 is about arm's length from the user's face. For example, the magnifier 112 magnifies the display D about 150 percent or more when the dry box 100 is positioned about arm's length from the user's face, but may be any desired magnification which makes information appearing on the display D appear larger, and therefore, easier to view.

According to one alternative embodiment of the invention, the magnifier 112 is initially separate from the lid 104, and the magnifier 112 is subsequently positioned over or in the window aperture 113 and coupled to the lid 104 with a substantially water-resistant seal 144 between the magnifier 112 and lid 104. By example and without limitation, the seal 144 is formed using a suitable adhesive such as a conventional room temperature vulcanizing (RTV) silicone rubber composition containing in general a cross-linkable polymeric, usually linear siloxane, a compound that has a vulcanizing effect, a catalyst and optionally other additives, like plasticizers, bonding agents, pigments, processing agents and fillers. Such adhesive RTV silicone rubber compositions are generally well-known, as disclosed by Schoeley, et al. in U.S. Pat. No. 5,969,057, "Adhesive RTV Silicone Rubber Compounds" issued Oct. 19, 1999, which is incorporated herein by reference. Other adhesives are also contemplated for forming the substantially water-resistant seal 144 and can be substituted for the RTV without deviating from the scope and intent of the present invention. Alternatively, the magnifier 112 is ultrasonically welded to the lid 104 to form the substantially water-resistant seal 144.

When the knock-out plug 136 is punched out and removed, the well 138 is transformed into an aperture that extends though the container floor 130 that is sized to admit a wire, plug or wiring harness there through and has an inside edge 146 that is harmless to insulated wires.

FIG. 5 is another cross-sectional perspective view through the dry box 100. The magnifier 112 is shown as the conventional transparent Fresnel magnifying lens and is illustrated as substantially covering at least a portion of the floor 114 of the lid 104. According to one embodiment of the invention, the Fresnel lens magnifier 112 is initially separate from the lid 104, and the lid 104 is molded onto the Fresnel lens magnifier 112 during an injection molding process in which the lid 104 is formed. Alternatively, the Fresnel lens magnifier 112 is formed integrally with the lid 104 with both the lid 104 and Fresnel lens magnifier 112 being formed of the transparent plastic, polycarbonate, or other material of which the Fresnel lens magnifier 112 is formed.

FIG. 6 is another cross-sectional perspective view through the dry box 100 wherein the magnifier 112 is shown as the conventional transparent Fresnel magnifying lens. The Fresnel lens magnifier 112 is initially separate from the lid 104, and is subsequently positioned in the window aperture 113 and coupled to the lid 104 using adhesive to form the substantially water-resistant adhesive seal 144 between the Fresnel lens magnifier 112 and lid 104. Alternatively, the Fresnel lens magnifier 112 is ultrasonically welded to the lid 104 to form the substantially water-resistant seal 144.

The Fresnel lens is known to be structurable to have a shorter focal length than a conventional convex lens for a similar degree of magnification. As a result, the container lid 104 is optionally lower in profile when the magnifier 112 is structured as the Fresnel lens, than when structured as the conventional convex lens. Therefore, the container 102 and lid 104 are sized compatibly with the portable electronic device E to ensure the Fresnel lens magnifier 112 is spaced a shorter distance l from the display D, whereby the Fresnel lens magnifier 112 is focused on the display D while providing significant magnification of the display D when the dry box 100 is about arm's length from the user's face. The distance l that the Fresnel lens magnifier 112 is spaced from the display D is less than the distance L (shown in FIG. 4) that the convex lens magnifier 112 is spaced from the display D. According to one embodiment of the invention, the Fresnel lens magnifier 112 magnifies the display D about 150 percent or more when the dry box 100 is positioned about arm's length from the user's face, but may be any desired magnification which makes information appearing on the display D appear larger, and therefore, easier to view.

FIG. 7 is a cross-sectional end view of another embodiment of the dry box 100 having an optically transparent window panel 148 in the window aperture 113 formed in the floor 114 of the lid 104. According to one embodiment of the invention, the transparent window panel 148 is formed as a sheet of substantially rigid optically transparent material without magnification, such as acrylic, or polycarbonate, or another substantially rigid transparent material, including glass. The combination of container 102 and lid 104 is lower in profile even than the dry box 100 having the Fresnel lens magnifier 112, such that the window aperture 113 is positioned in close proximity to the device E. Accordingly, an overall depth d of the container 102 and lid 104 combination is only slightly deeper than an overall thickness t (shown in FIG. 8) of the electronic device E secured therein. The transparent window panel 148 without magnification permits normal viewing of the portable electronic device E through the window aperture 113. In operation, the magnifier 112 is aligned with the window aperture 113 and is positioned a distance above the floor 114 of the lid 104 on a pair of integral sidewalls 150 that space a convex lens portion 152 of the magnifier 112 at the distance L from the display D of the electronic device E, or that spaces the Fresnel lens magnifier 112 at the distance l from the display D.

The magnifier 112 is movable relative to the window aperture 113 such that the optically transparent normal-viewing window panel 148 is accessible to the user. By example and without limitation, one of the sidewalls 150 of the magnifier 112 is hinged along one edge of the sealing lid 104 by a conventional rotational lid hinge 154 of a type well-known in the art. The hinged magnifier 112 is thus easily swung aside to expose the normal-viewing window panel 148, and is also easily swung into place over the normal-viewing window panel 148 to magnify the display D. According to one embodiment of the invention, the hinged magnifier 112 is latched in place over the normal-viewing window panel 148 by a catch mechanism 156 that includes, by example and without limitation, a conventional recess or detent 158 in the lid 104 and a mating tongue 160 formed along an edge of one of the sidewalls 150 of the hinged magnifier 112. Other conventional catch mechanisms are also contemplated and can be substituted without deviating from the scope and intent of the present invention.

Alternatively, the optically transparent normal-viewing window panel 148 in the window aperture 113 is a thin optically transparent resiliently pliable membrane without magnification that operates as a normal viewing window for viewing both the display D and control key pad P of the electronic device E. Simultaneously, the optically transparent membrane-type normal-viewing window panel 148 operates as a touch screen for operating the portable electronic device E. For example, the normal-viewing window panel 148 is a substantially planar thin optically transparent plastic sheet or film of a material, such as silicone, that is sufficiently transparent to permit substantially unimpeded viewing of the display D and yet remains flexible, even at extreme cold temperature, so that substantially normal finger pressure is effective for communicating tactile inputs to the electronic device E, i.e., depressing the keys of the control key pad P. Alternatively, it is known that polyvinylchloride (PVC) material at 0.010 inch to 0.015 inch thickness gives acceptable results. However, the membrane-type window panel 148 is optionally formed of another commercially available flexible material in different plastic families of resins that provide suitable results. According to one embodiment of the invention, however, the material of the membrane-type window panel 148 is on the order of 0.030 inch to 0.060 inch thick, which provides a ruggedness and durability that is desirable both for long product life and for protecting the electronic device E contained in the dry box 100. It is also known that PVC material at 0.060 inch to 0.150 inch thickness for the material of the membrane-type window panel 148 gives acceptable results, whereby the substantially normal finger pressure is effective for communicating tactile inputs to the electronic device E by depressing the keys of the control key pad P, and the material remains sufficiently flexible that, after depressing a key, the material resiliently returns to its original pre-depressed substantially planar condition. Such rugged and durable thicknesses is not believed to provide a membrane-type window panel 148 sufficiently flexible to allow tactile inputs to be communicated to a touch screen type electronic device, as described by Richardson in U.S. Pat. No. 6,646,864, "Protective Case for Touch Screen Device" issued Nov. 11, 2003, the complete disclosure of which is incorporated herein by reference. Rather, the thicker PVC material is used with electronic devices E of the type that use button-type keys for the control key pad P. Furthermore, unlike the membrane taught by Richardson in U.S. Pat. No. 6,646,864, the membrane-type window panel 148 of the present invention is intended to be universal as regards different electronic devices E; therefore, the membrane-type window panel 148 is not fitted to the button-type keys for the control key pad P, but is a substantially planar sheet. Thus, unlike the membrane taught by Richardson in U.S. Pat. No. 6,646,864, the membrane-type window panel 148 of the present invention does not include special features such that the buttons on the PDA are easily operated through the protective membrane provided by the membrane-type window panel 148, nor special features to aid the user in pressing the buttons. The membrane-type window panel 148 of the present invention does not include dimpled areas for the user's finger located directly over the buttons, nor does it include a section of membrane defined by a thinner area around the section for enabling the user to more easily deflect the section of membrane over the button.

The normal viewing transparent membrane-type window panel 148 also remains sufficiently resilient to return to it pre-depressed condition when the finger pressure is removed. Such resilient transparent membranes for forming the membrane-type window panel 148 are generally well-known, as disclosed by Wong, et al. in U.S. Pat. No. 6,614,423, "Touch-Pad Cover Protecting Against Wear, Spills and Abuse" issued Sep. 2, 2003, which is incorporated herein by reference; and Richardson in U.S. Pat. No. 6,646,864, which discloses a protective case for an electronic device that has a touch screen, the protective case having a membrane adapted to the specific contour and profile of the electronic device that allows the user to use the touch screen interface, the complete disclosure of which is incorporated herein by reference. The combination of container 102 and lid 104 is lower profile even than the dry box 100 having the Fresnel lens magnifier 112, such that the resilient transparent membrane of the window panel 148 is in close proximity to, or even in direct contact with, the device control key pad P. Accordingly, an overall depth d of the container 102 and lid 104 combination is the same depth or only slightly deeper than an overall thickness t (shown in FIG. 8) of the electronic device E secured therein. The device control key pad P is thus operable through the resiliently pliable yet optically transparent membrane-type window panel 148, which also permits viewing of the display D, while the device E remains protected inside the dry box 100.

The resiliently pliable, optically transparent membrane-type window panel 148 permits normal viewing and operation of the portable electronic device E within the dry box 100. The magnifier 112 provides significant magnification of the display D. By example and without limitation, the magnifier 112 is spaced above the lid 104 and the resiliently pliable, optically transparent membrane-type window panel 148 in the window aperture 113. The magnifier 112 is aligned with the window aperture 113 at a distance above the resiliently pliable and optically transparent membrane-type window panel 148 in the window aperture 113 that effectively spaces the convex lens magnifier 112 at the distance L from the display D and control key pad P of the electronic device E, or that spaces the Fresnel lens magnifier 112 at the distance l from the display D and control key pad P.

The magnifier 112 is movable relative to the membrane-type window panel 148 such that the resiliently pliable, optically transparent membrane-type window panel 148 is available to the user's fingers for manipulation of the control key pad P. By example and without limitation, the sidewall 150 of the magnifier 112 is hinged along one edge of the sealing lid 104 by the conventional lid hinge 154 of a type well-known in the art. The hinged magnifier 112 is thus easily swung aside to expose the transparent membrane of the window panel 148, and is also easily swung into place over the transparent membrane-type window panel 148 to magnify the display D. According to one embodiment of the invention, the hinged magnifier 112 is latched in place over the transparent membrane-type window panel 148 in the window aperture 113 by the catch mechanism 156 or another conventional catch mechanism.

Figure 8:
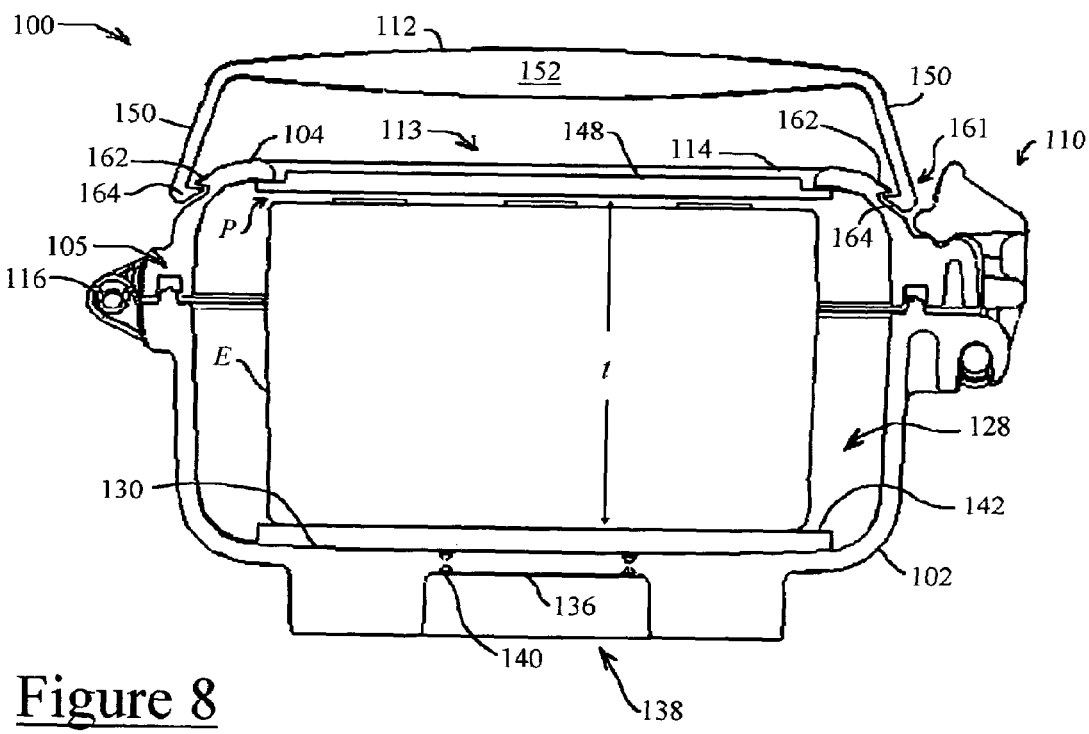
FIG. 8 is a cross-sectional end view of another embodiment of the dry box of the invention having a non-magnified normal viewing transparent panel in the window formed in the floor of the lid with the magnifier spaced there above on a pair of slides.

FIG. 8 is a cross-sectional end view of another embodiment of the dry box 100 having the non-magnified normal viewing optically transparent membrane-type window panel 148 in the widow aperture 113 formed in the floor 114 of the lid 104, wherein the transparent membrane of the window panel 148 is formed as the sheet of resiliently pliable substantially optically transparent material without magnification that permits normal viewing of the portable electronic device E. The magnifier 112 is spaced the appropriate distance above the lid 104 and the optically transparent normal-viewing membrane-type window panel 148 for viewing the display D at the desired magnification. The magnifier 112 is either the conventional convex lens, the Fresnel lens, or another magnifying lens capable of magnifying the display D of the electronic device E.

The magnifier 112 is movable relative to the resiliently pliable, optically transparent membrane-type window panel 148 by sliding relative to the floor 114 of the lid 104 by means of a sliding mechanism 161. By example and without limitation, the lid 104 is formed with a pair of rails 162 along opposing edges. The sidewalls 150 of the sliding magnifier 112 are both formed with mating tongues 164 that fit into the rails 162. The sidewalls 150 space the tongues 164 an appropriate distance from the lens portion 152 of the magnifier 112. The rails 162 and mating tongues 164 are structured to cooperate in a manner that permits the sliding magnifier 112 to slide along the rails 162 relative to the container lid 104. Optionally, the sliding magnifier 112 is removable from the lid 104 by continuous sliding of the sidewalls 150 along the rails 162 until the tongues 164 disengage from the rails 162. The sliding magnifier 112 is replaceable on the lid 104 by re-engaging the tongues 164 with the mating rails 162 and sliding the magnifier 112 into position over the window aperture 113.

Alternatively, the non-magnified normal-viewing window panel 148 in the window aperture 113 of the lid 104 is formed as the thin transparent resilient membrane without magnification that operates as a touch screen for operating the portable electronic device E. The magnifier 112 is spaced the appropriate distance above the window aperture 113 of the lid 104 and the optically transparent membrane of the membrane-type window panel 148 for viewing the display D at the desired magnification. The magnifier 112 is either the conventional convex lens, the Fresnel lens, or another magnifying lens capable of magnifying the display D of the electronic device E. The magnifier 112 is movable relative to the window aperture 113 and the optically transparent membrane-type window panel 148 by sliding on the rails 162 relative to the floor 114 of the lid 104. The sliding magnifier 112 is thus moved to permit access to the window panel 148.

Figure 9:
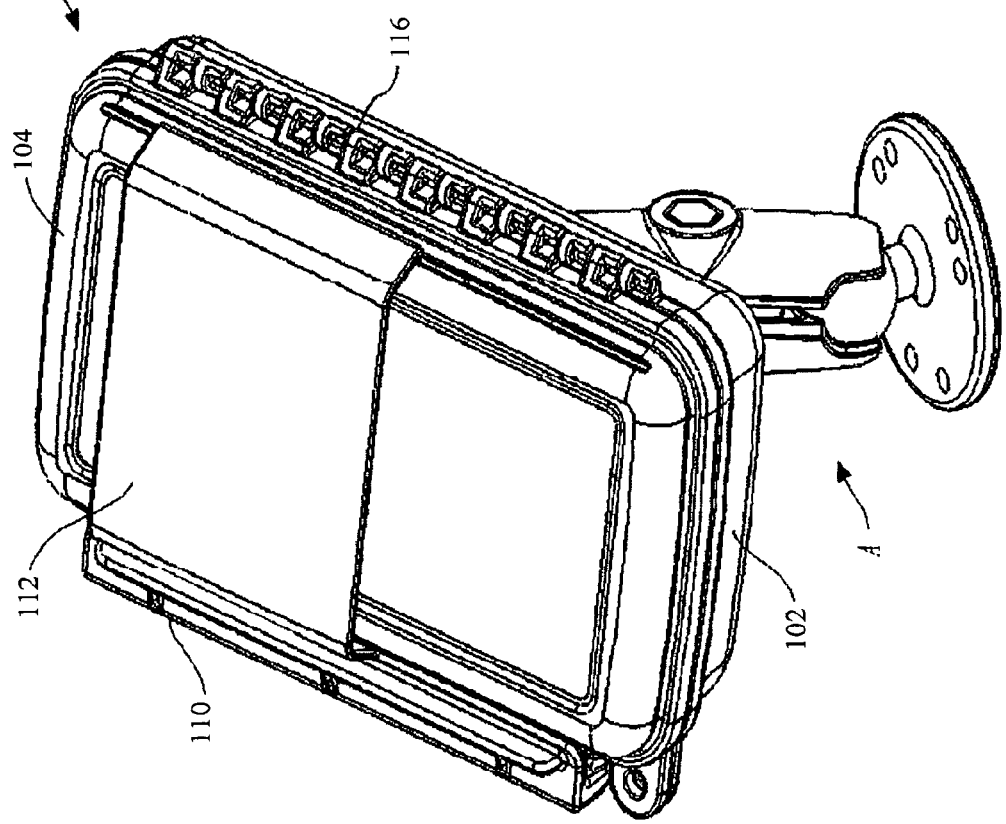
FIG. 9 is a is a perspective view of the dry box of the invention wherein the magnifier is a sliding magnifier provided on the container lid.

FIG. 9 is a is a perspective view of the dry box 100 wherein the sliding magnifier 112 is shown as being shorter than the lid 104. The sliding magnifier 112 is optionally slid into position over the display D of the electronic device E for magnifying the display D. Simultaneously, the control key pad P of the electronic device E is exposed by the sliding magnifier 112 for manipulation through the resiliently pliable, optically transparent membrane of the window panel 148. The normal viewing window panel 148 is optionally formed as either the substantially rigid transparent material, or the thin optically-transparent and flexibly-resilient membrane material.

Figure 10:
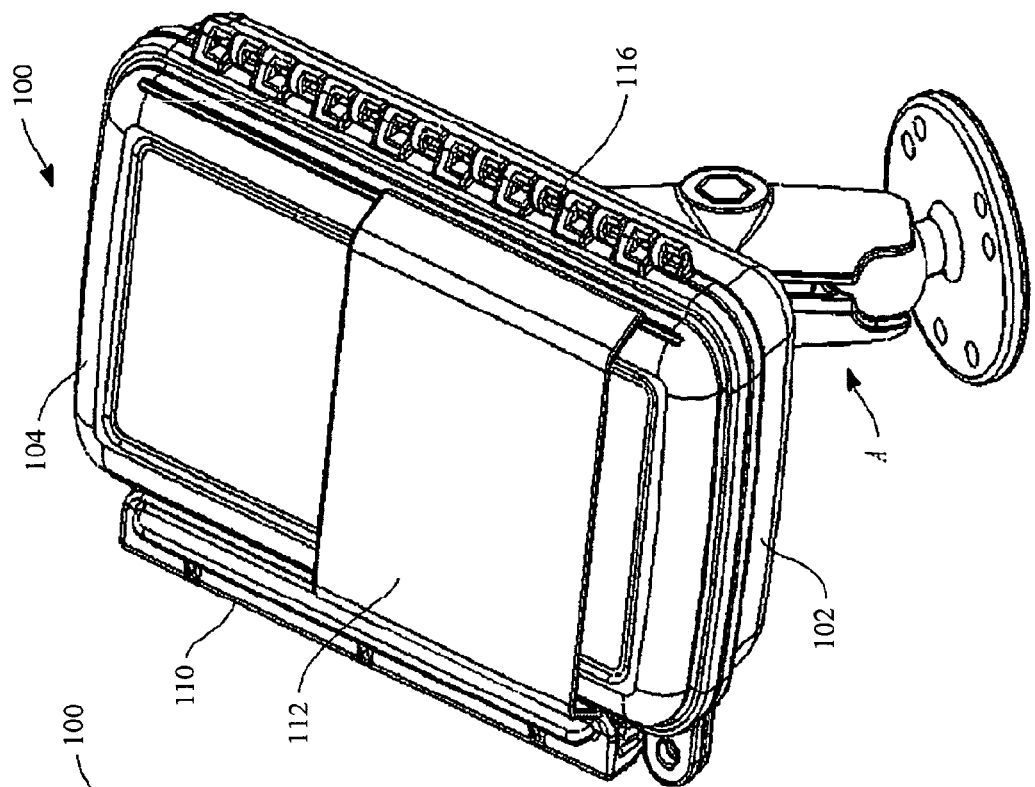
FIG. 10 is another perspective view of the dry box of the invention having a sliding magnifier provided on the container lid.

FIG. 10 is another perspective view of the dry box 100 wherein the sliding magnifier 112 is shown as being shorter than the lid 104. The sliding magnifier 112 is optionally slid into position over the control key pad P of the electronic device E for magnifying symbols typically displayed on keys of the control key pad P. Simultaneously, the display D of the electronic device E is exposed by the sliding magnifier 112 through the optically transparent window panel 148. The normal viewing window panel 148 is optionally formed as either the substantially rigid optically transparent material, or the optically transparent resiliently pliable membrane material.

Figure 11:
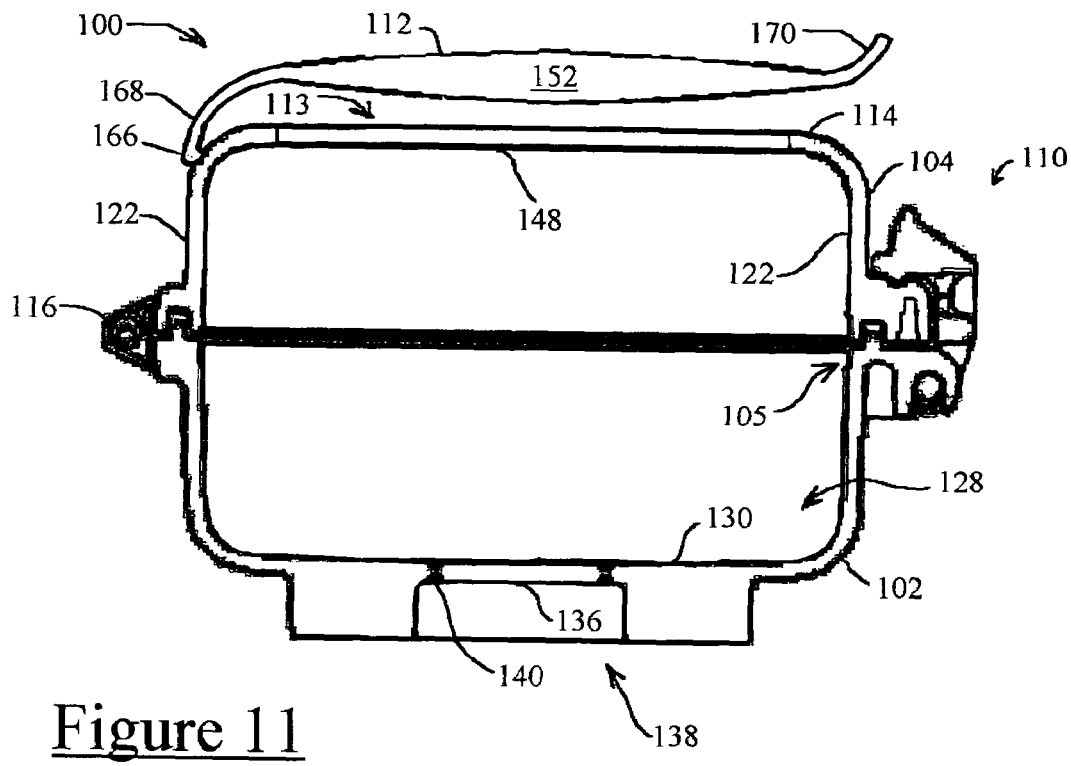
FIG. 11 is a cross-sectional end view of another embodiment of the dry box of the invention having the normal viewing window panel formed integrally with the floor of the lid as a single continuous sheet of substantially transparent material without magnification.

FIG. 11 is a cross-sectional end view of another embodiment of the dry box 100 having the normal viewing window panel 148 formed integrally with the floor 114 and walls 122 of the lid 104 as a single continuous sheet of substantially transparent material without magnification, such as transparent plastic, acrylic, or polycarbonate, or another substantially rigid transparent material, including glass. Alternatively, the optically transparent window panel 148 is initially separate from the lid 104, and the lid 104 is molded onto the window panel 148 during an injection molding process in which the lid 104 is formed.

The magnifier 112 is a sheet of flexible magnifying plastic of a type that is well-known in the art. See, for example, U.S. Pat. No. 3,140,883, "Book Cover," which is incorporated herein by reference. See, also, U.S. Pat. No. 4,828,558, "Laminate Optic with Interior Fresnel Lens," and U.S. Pat. No. 4,848,319, "Refracting Solar Energy Concentrator and Thin Flexible Fresnel Lens," which are both incorporated herein by reference. The sheet magnifier 112 is thus made substantially flexible. The lens portion 152 of the flexible sheet magnifier 112 is optionally a conventional convex lens (shown), a Fresnel lens, or another magnifying lens suitable for optically magnifying the display D of the electronic device E.

The flexible sheet magnifier 112 is coupled to the lid 104 by an edge hinge joint 166 that is formed, by example and without limitation, using an adhesive such as an RTV adhesive or another suitable adhesive between the lid 104 and one edge 168 of the flexible sheet magnifier 112. Alternatively, the edge hinge joint 166 between the flexible sheet magnifier 112 and the lid 104 is formed by ultrasonically welding the edge 168 of the flexible sheet magnifier 112 to the lid 104. The flexible sheet magnifier 112 is operable like a cover of a book, i.e., it is grasped along an edge 170 opposite the edge hinge joint 166 and simply flipped into position over the normal viewing window panel 148 in the window aperture 113 for magnifying the display D of the electronic device E, or turned back to access the normal viewing window panel 148.

Figure 12:
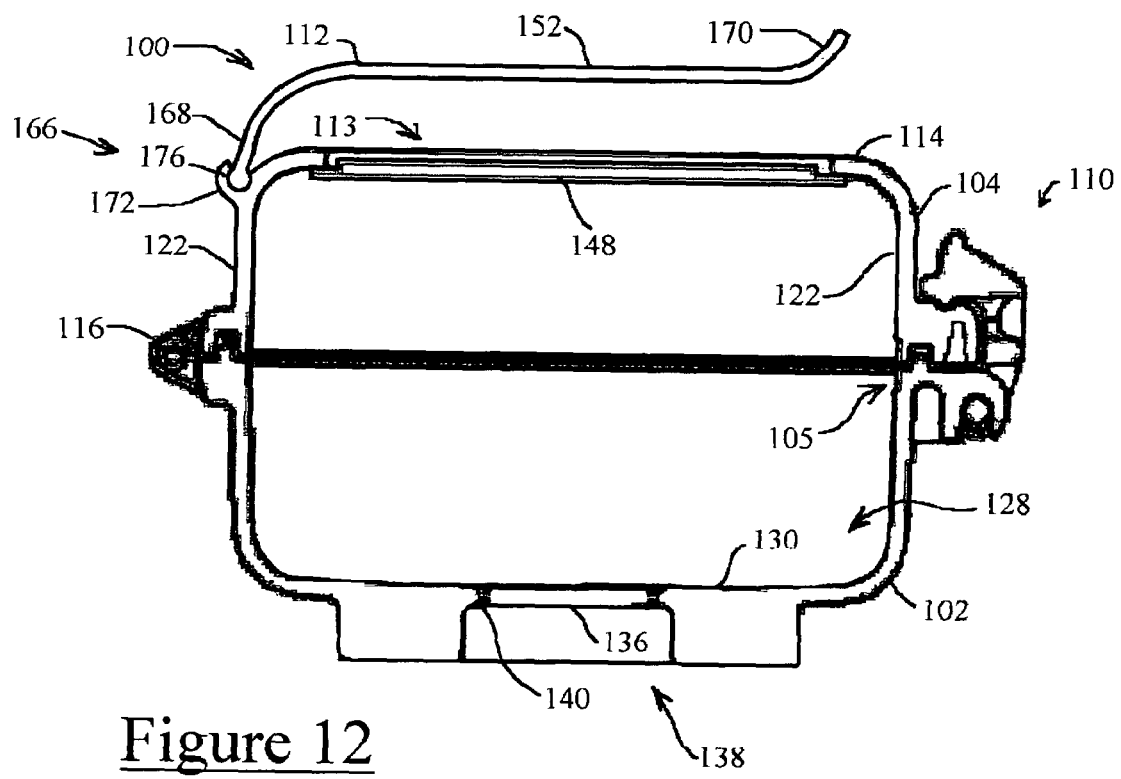
FIG. 12 is a cross-sectional end view of another embodiment of the dry box of the invention having the separate normal viewing panel coupled in the window of the lid with a substantially water-resistant seal between the transparent window panel and the lid wherein the normal viewing window panel is optionally formed as either a substantially rigid transparent material, or a thin transparent resilient membrane material.

FIG. 12 is a cross-sectional end view of another embodiment of the dry box 100 having the normal viewing window panel 148 initially formed separately from the floor 114 of the lid 104. The window panel 148 is subsequently positioned in the window aperture 113 and coupled to the lid 104 with the substantially water-resistant seal 144 between the optically transparent window panel 148 and the lid 104. The optically transparent normal viewing window panel 148 is optionally formed as either the substantially rigid transparent material, or the thin transparent resilient membrane material.

The edge hinge joint 166 coupling the flexible sheet magnifier 112 is optionally removably hinged along one side of the lid 104. For example, the lid 104 is formed with an open tubular "keyhole" slot 172 along one sidewall 122, the slot 172 having a lengthwise opening 174 adjacent to the window aperture 113. The edge 168 of the flexible sheet magnifier 112 is formed with a substantially cylindrical key-shaped insert 176 structured to mate with and be retained by the female slot 172. The flexible sheet magnifier 112 is operable like a page or cover of a book, i.e., it is grasped along the edge 170 opposite the edge hinge joint 166 and simply flipped into position over the normal viewing window panel 148 in the window aperture 113 for magnifying the display D of the electronic device E, or turned back to access the normal viewing window panel 148.

The sliding magnifier 112 is mounted on the lid 104 by engaging one end of the key-shaped insert 176 with one end of the keyhole slot 172 and sliding the insert 176 along the keyhole slot 172 to a position beside the window aperture 113 in the lid 104. Optionally, the sliding magnifier 112 is removable from the lid 104 by continuous sliding of the insert 176 along the keyhole slot 172 until the insert 176 disengages from the keyhole slot 172. The sliding magnifier 112 is replaceable on the lid 104 by re-engaging the insert 176 with the mating keyhole slot 172 and sliding the magnifier 112 into position beside the window aperture 113.

When the opening 174 in the tubular keyhole slot 172 is sufficiently open, and the edge 168 of the flexible sheet magnifier 112 is sufficiently thin as compared with the opening 174, the tubular keyhole slot 172 operates in combination with the cylindrical key-shaped insert 176 to form an alternative edge hinge joint 166 to the example illustrated in FIG. 11.

Figure 13:
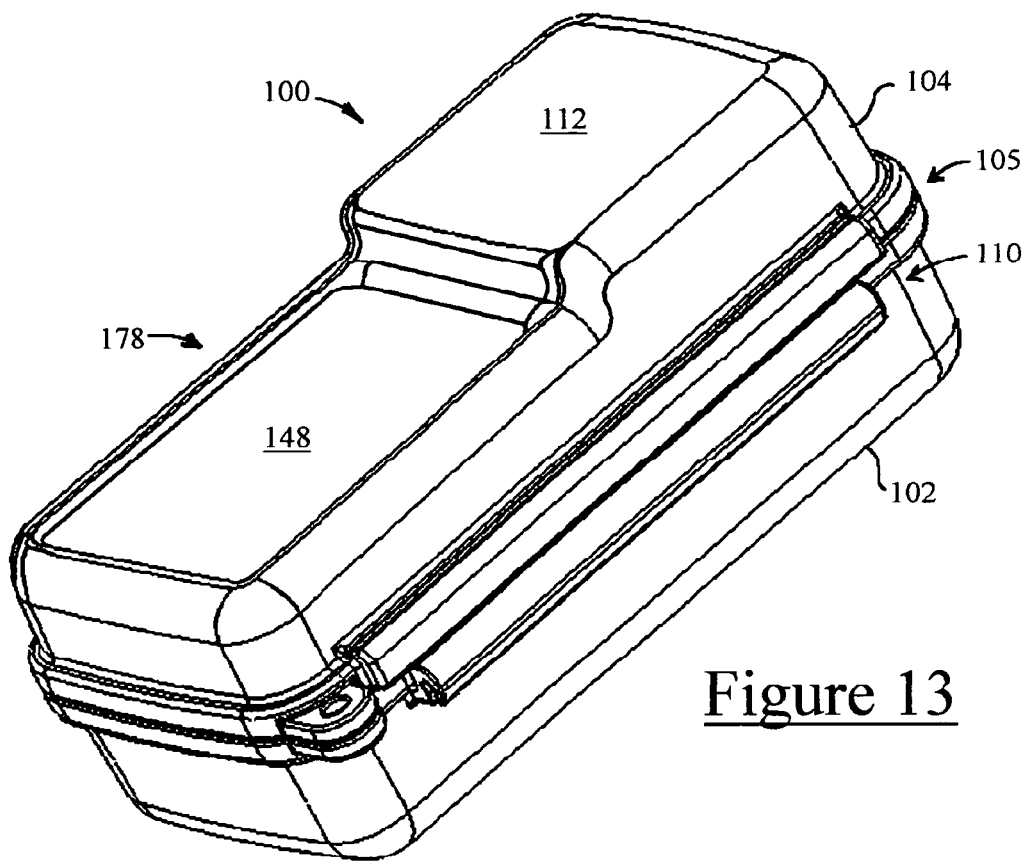
FIG. 13 is a perspective view of another alternative embodiment of the dry box of the invention having the window in the box lid filled with a combination viewing panel that includes a normal viewing portion in combination with the magnifier.

FIG. 13 is a perspective view of another alternative embodiment of the dry box 100 of the invention having the window aperture 113 filled with a combination viewing panel 178 that includes the optically transparent window panel 148 as a normal viewing portion in combination with the magnifier 112. According to one embodiment of the invention, the normal viewing window panel portion 148 is formed as the thin, resiliently pliable and optically transparent membrane without magnification that operates as a touch screen for operating the portable electronic device E, as discussed herein. The magnifier 112 and normal viewing window panel 148 of the combination viewing panel 178 may be relatively offset so that the magnifier 112 is spaced away from the display D, while the thin membrane of the normal viewing window panel portion 148 is close to or even touching the control key pad P of the electronic device E. Therefore, the magnifier 112 is both focused on the display D and provides significant magnification of the display D when the dry box 100 is about arm's length from the user's face, while the thin membrane of the normal viewing window panel portion 148 operates as a touch screen for operating the portable electronic device E, whereby substantially normal finger pressure is effective for communicating tactile inputs to the electronic device E, i.e., depressing the keys of the control key pad P. When the magnifier 112 is embodied as the optically transparent convex lens, the magnifier 112 is spaced the distance L from the display D. According to one embodiment of the invention, the magnifier 112 and the normal viewing window panel portion 148 are formed as a unitary combination viewing panel 178. The unitary combination viewing panel 178 is optionally integral with the lid 104.

Figure 14:
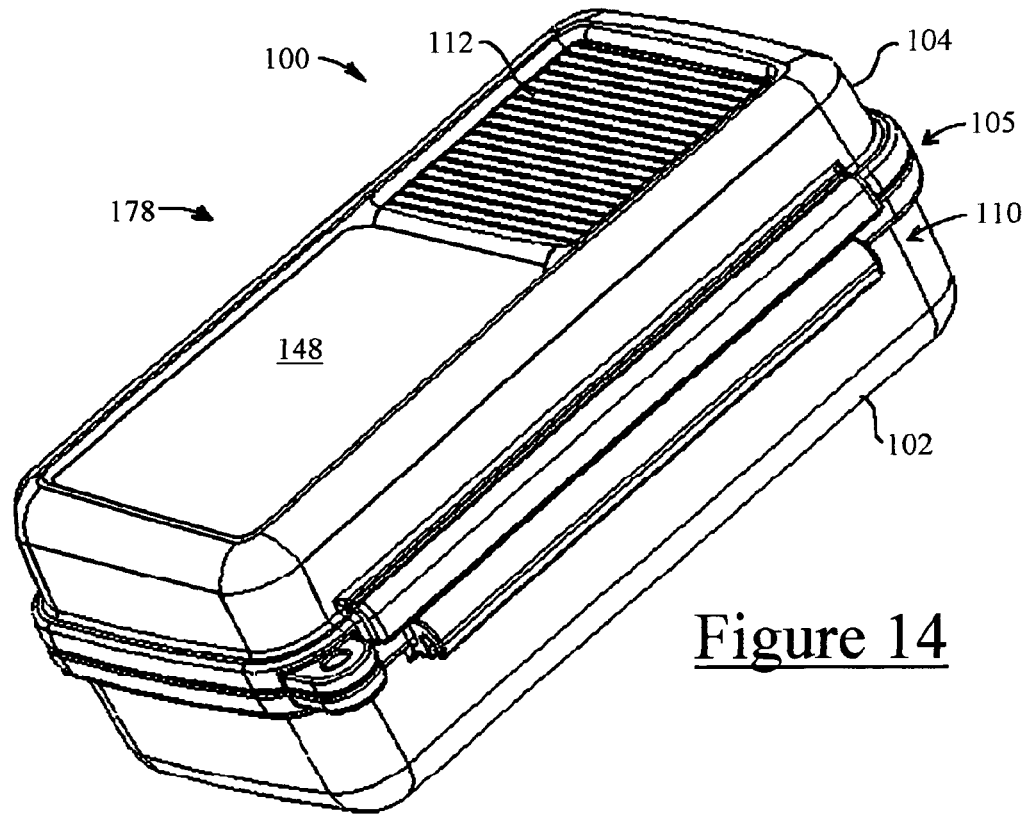
FIG. 14 is a perspective view of another alternative embodiment of the dry box of the invention having the window in the box filled with another embodiment of the combination viewing panel that includes the normal viewing portion in combination with the magnifier.

FIG. 14 is a perspective view of another alternative embodiment of the dry box 100 of the invention having the window aperture 113 filled with another embodiment of the combination viewing panel 178 that includes the normal viewing window panel portion 148 in combination with the magnifier 112, where the magnifier 112 is of a type, such as the optically transparent Fresnel lens, for example, that is effective for magnifying the appearance of the device display D even when placed in close proximity to or even touching the display D. According to one embodiment of the invention, the normal viewing portion 178 is formed as the thin optically transparent resilient membrane without magnification that operates as a touch screen for operating the portable electronic device E, as discussed herein. The magnifier 112 and normal viewing window panel portion 148 of the combination viewing panel 178 may be substantially co-planar so that both the magnifier 112 and the thin membrane of the normal viewing window panel portion 148 are close to or even touching the electronic device E. Therefore, the magnifier 112 is both focused on the display D and provides significant magnification of the display D when the dry box 100 is about arm's length from the user's face, while the thin membrane of the normal viewing window panel portion 148 operates as a touch screen for operating the portable electronic device E, whereby substantially normal finger pressure is effective for depressing the keys of the control key pad P. According to one embodiment of the invention, the magnifier 112 and the normal viewing window panel portion 148 are formed as a unitary combination viewing panel 178, wherein the magnifier 112 and window panel 148 are integral. The unitary combination viewing panel 178 is optionally integral with the lid 104.

Figure 15:
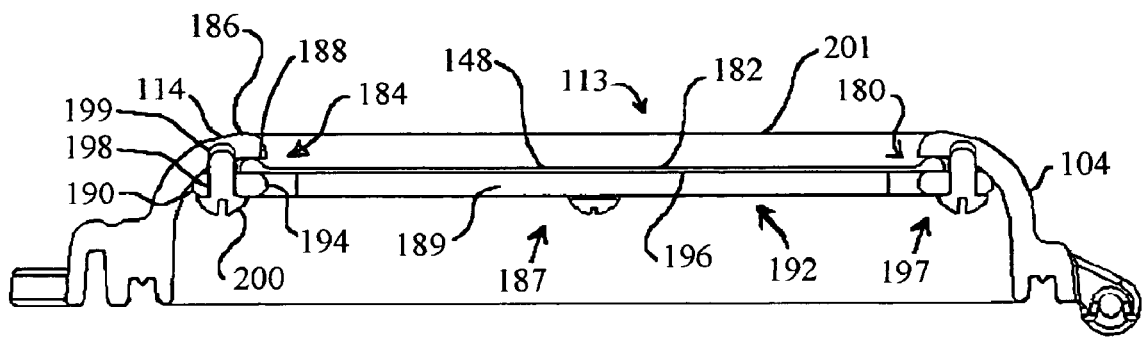
FIG. 15 is a cross-section view of one embodiment of the substantially water-resistant circumferential sealing mechanism of the invention for attaching the resiliently pliable normal viewing membrane-type panel into the lid under the window.

FIG. 15 is a cross-section view of the lid 104 that illustrates one substantially water-resistant circumferential sealing mechanism 180 for attaching the resiliently pliable normal viewing membrane-type window panel 148 into the lid 104 under the window aperture 113. The membrane-type window panel 148 is molded of an optically transparent PVC or another suitable optically transparent material having a central or interior thin resiliently pliable window portion 182 surrounded by a continuous peripheral sealing lip 184 formed as a relatively increased thickness, such as an enlarged lump or raised bump or swelling of the membrane material of which the window panel 148 is formed. The swelling-type sealing lip 184 optionally includes a curvature, the curvature including curved fillets between the swelling and the window portion 182. Accordingly, the peripheral sealing lip 184 is integral with the flexible window portion 182. The flexible window portion 182 is slightly larger in dimension than the window aperture 113 in the lid 104 so that it extends under a substantially rigid lip portion 186 that forms the inner periphery of the window aperture 113. The peripheral sealing lip 184 surrounding the flexible window portion 182 is also larger than the peripheral lip portion 186 of the window aperture 113 and similarly extends under the lip portion 186. A clamping mechanism 187 for clamping the peripheral sealing lip 184 of the membrane-type window panel 148 tightly against a substantially planar contact surface 188 of the rigid lip portion 186 of the window aperture 113 is embodied, by example and without limitation, as a window sash 189 that is sized having an outer periphery 190 that larger than the lid window aperture 113 but is smaller than the inside of the lid 104 so that it fits therein without significant interference. A window aperture 192 of the window sash 189 is formed within an inner peripheral lip 194 sized to substantially match the size of the lid window aperture 113. The window sash 189 is formed with a substantially planar contact surface 196 between the inner and outer peripheries 194, 190. The window sash 189 is secured by a securing mechanism 197 to the contact surface 188 of the rigid lip portion 186 with the peripheral sealing lip 184 of the window panel 148 clamped in between. For example, according to one embodiment of the securing mechanism 197, the window sash 189 is formed with a uniform pattern multiple pass-through fastener apertures 198 and the lid 104 is formed with cooperating threaded holes 199 in the same uniform pattern for fasteners 200 that secure the membrane-type window panel 148 to the lid floor 114 under the window aperture 113 with the frame contact surface 196 opposite the rigid lip portion 186 of the window aperture 113 and the peripheral sealing lip 184 compressed therebetween.

Thus, according to one embodiment, the clamping mechanism 187 is formed by the window sash 189 being secured to the window aperture lip portion 186 by the securing mechanism 197. For example, the peripheral sealing lip 184 of the membrane-type window panel 148 is clamped between the frame contact surface 196 and the opposing rigid lip portion 186 of the window aperture 113 by the clamping mechanism 187 when the fasteners 200 are secured to the lip portion 186 of the window aperture 113 around the window sash 189. The central thin resiliently pliable window portion 182 within the peripheral sealing lip 184 is thus secured across the window aperture 113 in the lid floor 114.

According to different alternative embodiments of the securing mechanism 197, the window sash 189 is secured to the floor 114 of the lid 104 using another fastening mechanism, such as flexible clips, or another suitable mechanism capable of securing the window sash 189 against the lid floor 114, whereby the fastener apertures 198 and fasteners 200 are eliminated.

Although illustrated by example and without limitation as being positioned inside the lid 104, the membrane-type window panel 148 and the substantially water-resistant circumferential sealing mechanism 180 are alternatively positioned against the substantially rigid lip portion 186 of the window aperture 113 on a substantially planar outside upper surface 201 of the lid floor 114.

Figure 16:
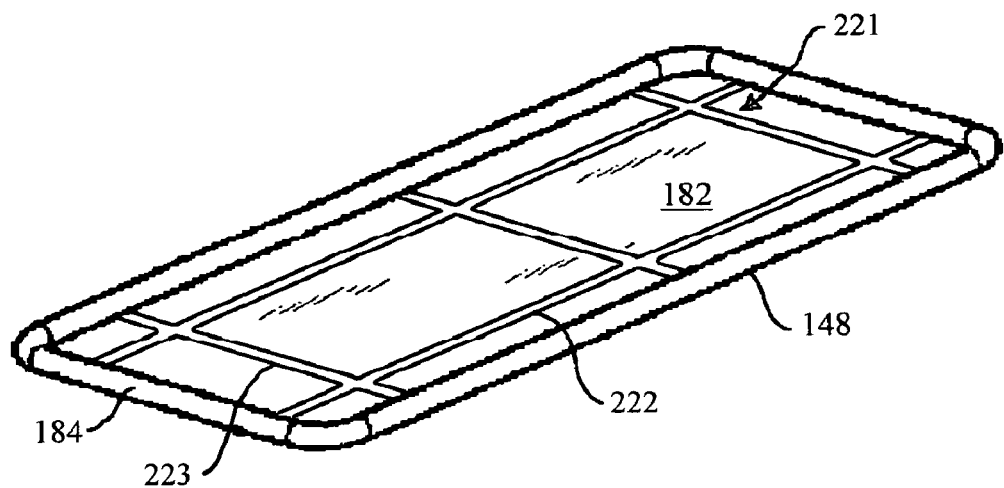
FIG. 16 illustrates the resiliently pliable normal viewing membrane-type panel of the invention having the central thin resiliently pliable window portion surrounded by a peripheral seal portion of the invention formed as the relatively enlarged lump or raised bump or swelling of the membrane material of which the panel is formed.

FIG. 16 illustrates the resiliently pliable normal viewing membrane-type window panel 148 having the central thin resiliently pliable window portion 182 surrounded by the peripheral sealing lip 184 formed as the relatively enlarged lump or raised bump or swelling of the membrane material of which the window panel 148 is formed.

Figure 17:
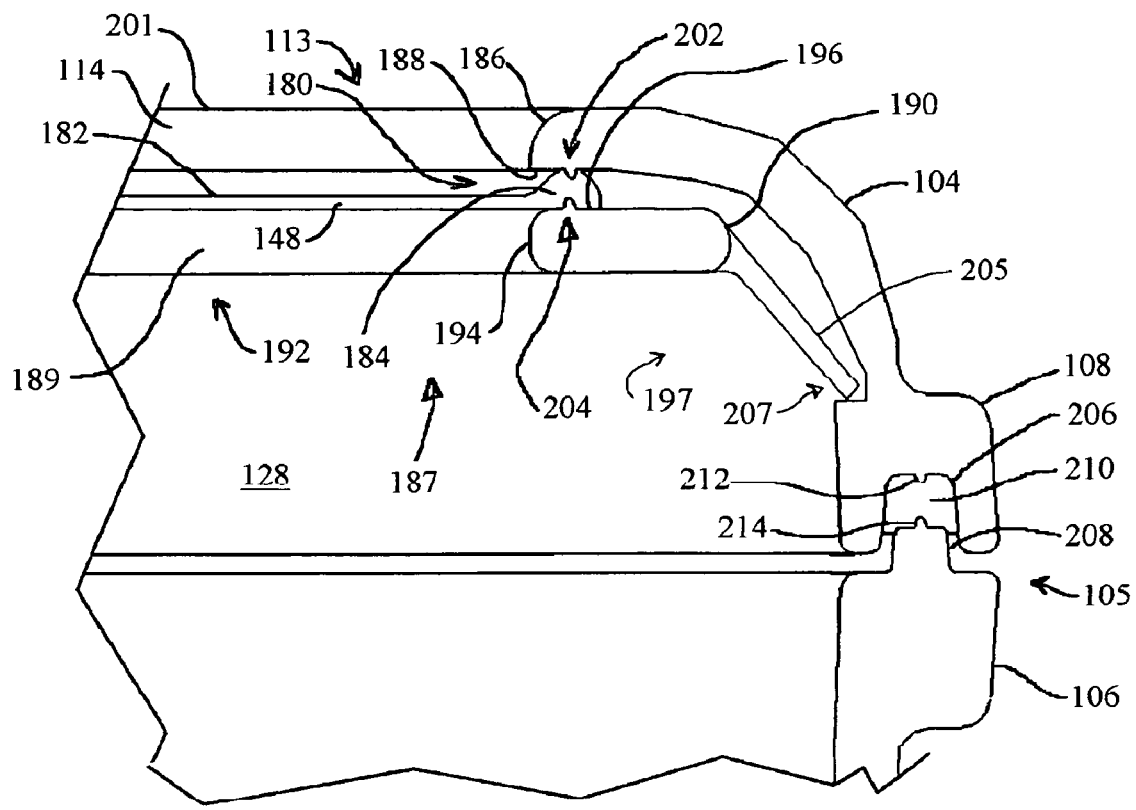
FIG. 17 is a close-up of the substantially water-resistant circumferential sealing mechanism of the invention that shows the peripheral seal portion of the invention of the membrane-type panel being captured between a contact surface of the frame and an opposing rigid portion the lip of the lid window when fasteners are secured to the lip portion of the window, FIG. 17 also illustrates optionally moisture barriers formed in the contact surface of the frame and an opposing rigid portion the lip of the lid window.

FIG. 17 is a close-up of the substantially water-resistant circumferential sealing mechanism 180 that shows the peripheral sealing lip 184 of the membrane-type window panel 148 being compressed against the rigid lip portion 186 of the window aperture 113 by the clamping mechanism 187. For example, the peripheral sealing lip 184 is captured between the frame contact surface 196 and the opposing rigid lip portion 186 of the window aperture 113 when the window sash 189 is secured by the securing mechanism 197 to the lip portion 186 of the window aperture 113. According to one embodiment of the invention, one or both the frame contact surface 196 and the lip portion 186 of the window aperture 113 include an optional circumferential barrier 202, 204 shown here as a ridge projected from the frame contact surface 196 toward the opposite window lip portion 186, or from the lid contact surface 188 toward frame contact surface 196, respectively. When present, the optional circumferential ridge-type barriers 202 and/or 204 dig into the relatively soft and pliable peripheral sealing lip 184 of the membrane-type window panel 148, which increases the quality of the sealing mechanism 180 by both adding additional barriers against moisture intrusion, and increasing the hold on the peripheral sealing lip 184 of the respective lid and frame contact surfaces 188,196.

FIG. 17 illustrates one alternative securing mechanism 197 for compressing the peripheral sealing lip 184 of the membrane-type window panel 148 tightly against a substantially planar contact surface 188 of the rigid lip portion 186 of the window aperture 113. Accordingly, several rigid clips 205 are molded integrally with the window sash 189. The clips 205 are thin enough in cross section to flex during entry into the lid 104. The stiffness of the clips 205 cause them to expand into notches 207 formed in the lid 104 when the window sash 189 is pushed deeply into the lid 104, thereby compressing the seal 184 between the opposing contact surfaces 188 and 196 of the window aperture 113 and the window sash 189, respectively. The clips 205 rely on their resilience or "springiness" to continue squeezing the seal 184 between the opposing contact surfaces 188 and 196. Thus the clips 205 and notch 207 mechanism is similar to the type disclosed by Cooper in U.S. Pat. No. 3,972,459, "Tape Dispenser Having Snap Lock Core Members," which is incorporated herein by reference.

FIG. 17 also illustrates one embodiment of the gasketed substantially water-resistant circumferential seal mechanism 105 between respective peripheral lip portions 106, 108 formed around their respective openings in the dry box container 102 and lid 104. By example and without limitation, the seal mechanism 105 is provided by a circumferential groove 206 in either the container lip 106 or the lid lip 108 (shown).

A mating tongue 208 is formed in the opposing lip 108 or 106 (shown). A conventional resiliently pliable foam or rubber o-ring 210 is compressed into the circumferential groove 206 where it is further compressed when the tongue 208 is engaged with the groove 206 upon closing the lid 104 relative to the container 102 and engaging the latch mechanism 110. According to one embodiment of the invention, one or both of the groove 206 and tongue 208 include an optional circumferential ridge 212, 214 projected from the surface toward the opposite window tongue 208 or groove 206, respectively. When present, the optional circumferential ridge 212 and/or 214 dig into the relatively soft and pliable surface of the o-ring 210, which increases the quality of the sealing mechanism 105 by adding additional barriers against moisture intrusion.

Figure 18:
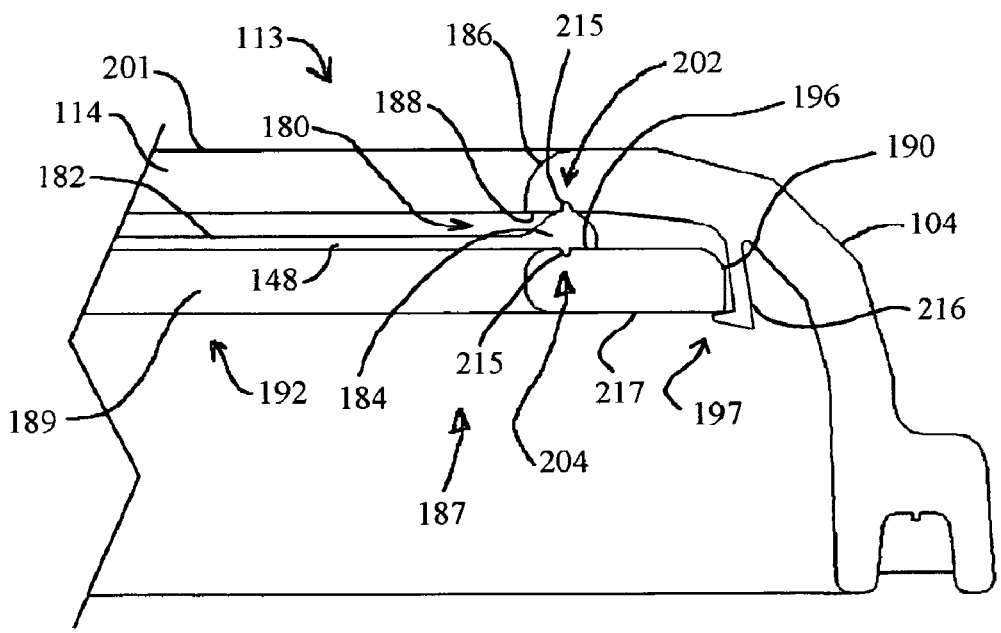
FIG. 18 is close-up of the substantially water-resistant circumferential sealing mechanism of the invention that illustrates an alternative embodiment of the optional barriers formed as circumferential depressions or grooves in the respective frame contact surface and lip portion of the window.

FIG. 18 is close-up of the substantially water-resistant circumferential sealing mechanism 180 that illustrates another alternative embodiment of the optional barriers 202, 204 shown here, by example and without limitation, as circumferential depressions or grooves in the respective frame contact surface 196 and lip portion 186 of the window aperture 113. When present, the optional circumferential groove-type barriers 202 and/or 204 provide recessed spaces into which a portion 215 of material of the relatively soft and pliable peripheral sealing lip 184 of the membrane-type panel window 148 extrudes or "flows" under pressure from the securing mechanism 197 that secures the window sash 189 to the lid floor 114 under the window aperture 113, or another clamping mechanism 187. The portion 215 of material of the peripheral sealing lip 184 that flows into the groove-type barriers 202 and/or 204 increase the quality of the sealing mechanism 180 by both adding additional barriers against moisture intrusion, and increasing the hold on the peripheral sealing lip 184 of the respective frame contact surface 196 and lip portion 186.

When the optional circumferential barriers 202, 204 are present, the peripheral sealing lip 184 is optionally formed having a substantially planar surface that is a continuation of the interior window portion 182 such that the peripheral sealing lip 184 does not have any increased thickness. Rather, the circumferential barriers 202, 204 optionally operate either to dig into the relatively soft and pliable material of the peripheral sealing lip 184, or to extrude the peripheral sealing lip 184, thereby eliminating any need for the increased thickness described herein.

FIG. 18 also illustrates an alternative securing mechanism 197 for securing the window sash 189 for compressing the peripheral sealing lip 184 of the membrane-type window panel 148 against the contact surface 188 of the rigid lip portion 186 of the window aperture 113. Accordingly, the window sash 189 is coupled to the floor 114 of the lid 104 using several rigid clips 216 molded integrally with the lid floor 114. The stiffness of the clips 216 cause them to snap back over a back or bottom surface 217 formed opposite the contact surface 196 when the window sash 189 is pushed deeply into the lid 104, thereby compressing the seal 184 between the opposing contact surfaces 188 and 196 of the window aperture 113 and the window sash 189, respectively. The clips 216 rely on their resilience or "springiness" to squeeze the seal 184 between the opposing contact surfaces 188 and 196 of the window aperture 113 and the window sash 189, respectively.

Figure 19:
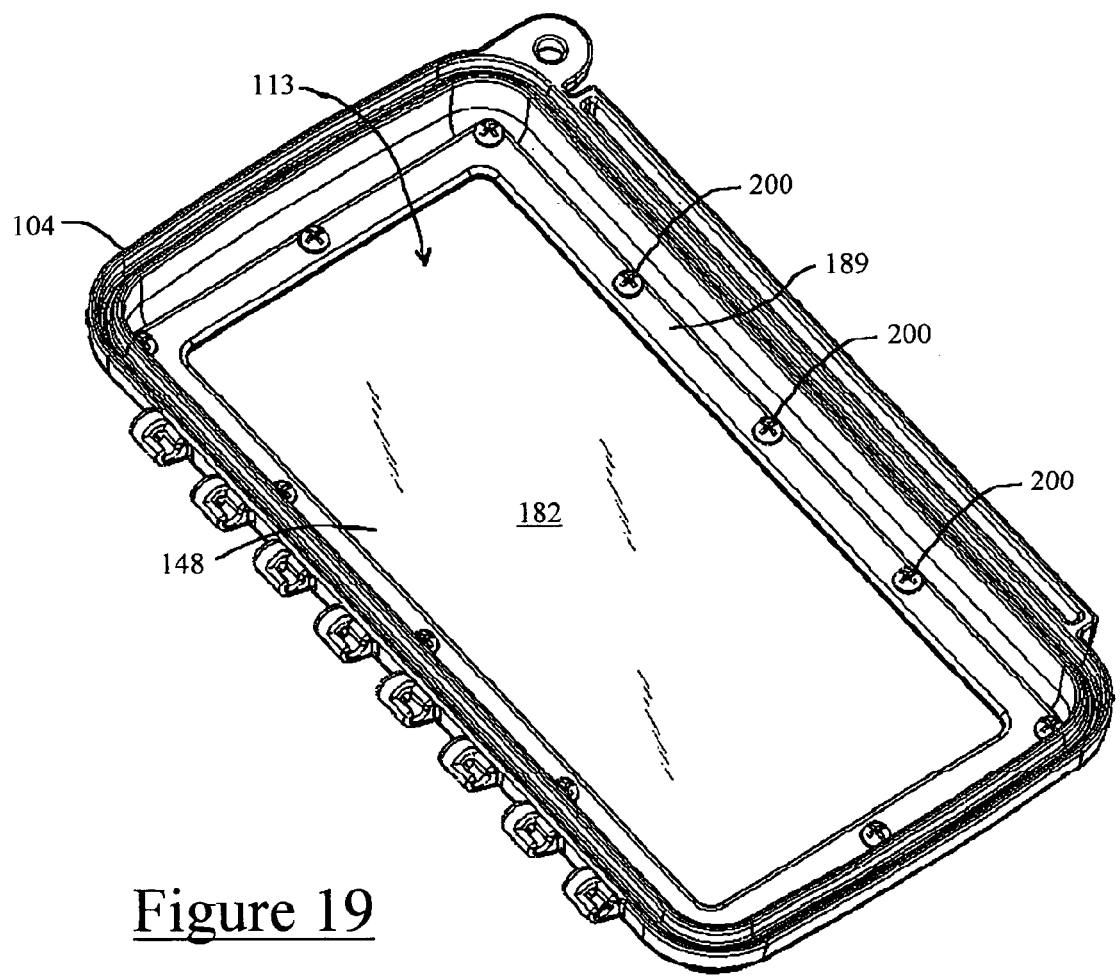
FIG. 19 is a bottom perspective view of the inside of the lid showing the membrane-type panel installed in the lid under the window, with the central thin resiliently pliable window portion positioned under the window and the frame clamping the peripheral seal portion of the invention against the rigid lip portion of the window when the multiple fasteners are secured.

FIG. 19 is a bottom perspective view of the inside of the lid 104 showing the membrane-type window panel 148 installed in the lid 104 under the window aperture 113, with the central thin resiliently pliable window portion 182 positioned under the window aperture 113 and the window sash 189 compressing the peripheral sealing lip 184 against the rigid lip portion 186 of the window aperture 113 when the multiple fasteners 200 are secured.

Figure 20:
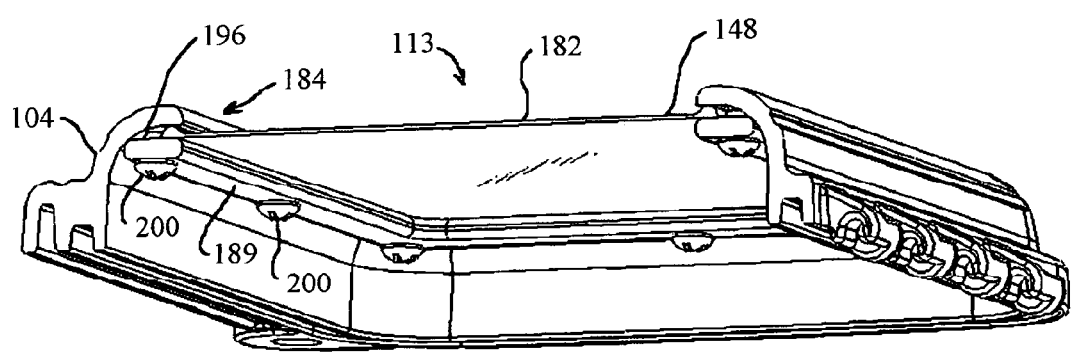
FIG. 20 is section view of the lid showing the membrane-type panel installed in the lid under the window, with the peripheral seal portion of the invention compressed between the substantially planar contact surface of the window frame and the rigid lip portion of the window when the multiple fasteners are secured.

FIG. 20 is section view of the lid 104 showing the membrane-type window panel 148 installed in the lid 104 under the window aperture 113, with the peripheral sealing lip 184 compressed between the substantially planar contact surface 196 of the window sash 189 and the rigid lip portion 186 of the window aperture 113 when the multiple fasteners 200 are secured.

Figure 21:
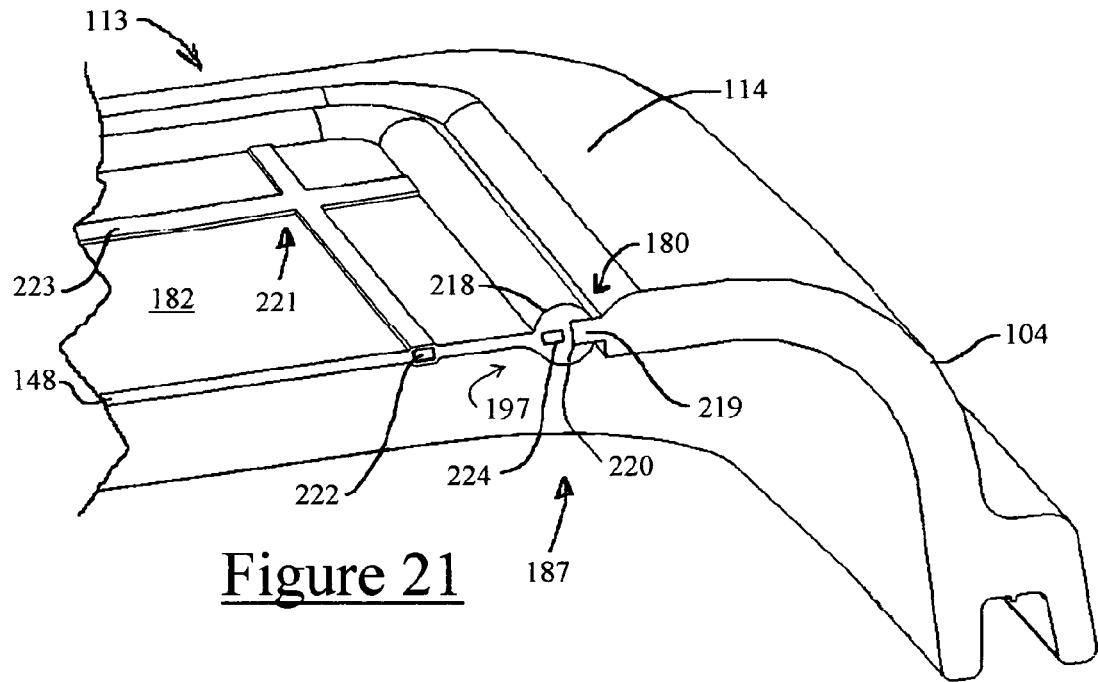
FIG. 21 is a close-up of an alternative embodiment of the substantially water-resistant circumferential sealing mechanism of the invention for the membrane-type panel having a peripheral seal portion of the invention of the membrane-type panel being formed as a relatively enlarged lump or raised bump or swelling of the membrane material of which the panel is formed.

FIG. 21 is a close-up of an alternative embodiment of the substantially water-resistant circumferential sealing mechanism 180 for the membrane-type window panel 148 having a continuous peripheral sealing lip 218 of the membrane-type window panel 148 being formed as a relatively increased thickness, such as an enlarged lump or raised bump or swelling of the membrane material of which the widow panel 148 is formed. The peripheral sealing lip 218 surrounds and is integral with the central flexible window portion 182 of the window panel 148, and by example and without limitation, is formed symmetrically about the plane of the central flexible window portion 182. The flexible window portion 182 is slightly smaller in dimension than the window aperture 113 in the lid 104 with the peripheral sealing lip 218 interfacing with a circumferential ridge 219 formed on the inner periphery of the window aperture 113 in the plane of the window floor 114. The peripheral sealing lip 218 surrounding the flexible window portion 182 is slightly larger than the inner peripheral ridge portion 219 of the window aperture 113. The enlarged peripheral sealing lip 218 is formed with a circumferential groove or slot 220 formed, by example and without limitation, in the plane of the central flexible window portion 182. The circumferential slot 220 is sized to engage the ridge portion 219 of the inner periphery of the window aperture 113 under slight compression, with the relatively soft and pliable peripheral sealing lip 218 of the membrane-type window panel 148 spreading to receive the rigid inner peripheral ridge 219 of the window aperture 113.

The combination of the peripheral sealing lip 218 and circumferential ridge 219 thus operate as the clamping mechanism 187 by clamping the peripheral sealing lip 218 of the membrane-type window panel 148 tightly against circumferential ridge 219.

When the circumferential sealing mechanism 180 for the membrane-type window panel 148 is configured as the circumferential ridge 219 and slot 220, an optional expanding mechanism 221 for expanding peripheral sealing lip 218 of the membrane-type window panel 148 so that the slot 220 engages the circumferential ridge 219. For example, the flexible window portion 182 is optionally formed with one or more lengthwise stiffeners 222 (also shown in FIG. 16). In another example, the flexible window portion 182 is also optionally formed with one or more crosswise stiffeners 223 (also shown in FIG. 16). The optional lengthwise and crosswise stiffeners 222, 223 are, for example, formed of thin and narrow strips of a stiff yet resiliently flexible spring material, such as clock spring steel, flat spring steel, high carbon wire, oil tempered wire, music wire, hard-drawn spring steel wire, stainless steel wire, spring brass, phosphor-bronze, silicon-bronze, Monel, Inconel, Duranickel, beryllium copper, or another suitable metal spring-type material. Alternatively, the optional lengthwise and crosswise stiffeners 222, 223 are, for example, formed of thin and narrow strips of a stiff yet resiliently flexible plastic material. The optional lengthwise and crosswise stiffeners 222, 223 are, for example, coupled to the flexible window portion 182 of the membrane-type window panel 148 by being molded or otherwise embedded into the surface of the flexible window portion 182. The optional lengthwise and crosswise stiffeners 222, 223 extend substantially up to or even into the peripheral sealing lip 218. The lengthwise and crosswise stiffeners 222, 223 are stiff yet sufficiently flexible to be temporarily bent or flexed without buckling during entry of the window panel 148 into the window aperture 113. Additionally, the lengthwise and crosswise stiffeners 222, 223 are sufficiently resilient to straighten after entry of the window panel 148 into the window aperture 113 and to thereafter expand the circumferential slot 220 of the peripheral sealing lip 218 into sealing contact with the circumferential ridge 219 on the inner periphery of the window aperture 113. Optionally, the lengthwise and crosswise stiffeners 222, 223 are sufficiently longer than the respective lengthwise and crosswise dimensions of the flexible window portion 182 of the membrane-type window panel 148 to impart a slight stretch to the flexible window portion 182. Optionally, the lengthwise and crosswise stiffeners 222, 223 are integral with one another, i.e., made as a single unit. Alternatively, the lengthwise and crosswise stiffeners 222, 223 are independent of one another. According to different embodiments, the optional lengthwise and crosswise stiffeners 222, 223 are coupled to the flexible window portion 182 of the membrane-type window panel 148 by adhesion onto the surface of the flexible window portion 182 using, for example, a suitable bonding agent such as RTV adhesive or another suitable adhesive.

The optional lengthwise and crosswise stiffeners 222, 223 of the optional expanding mechanism 221 are positioned to avoid interference with viewing and operating the electronic device E. For example, the lengthwise and crosswise stiffeners 222, 223 are spaced away from the center of the flexible window portion 182 in close proximity to the peripheral sealing lip 218 so as to be positioned outside the footprint of the device display D and the device control key pad P. When one of the optional crosswise stiffeners 223 is positioned near the center of the flexible window portion 182, its position is optionally adjusted to lie in a nonfunctional area of the electronic device E, such as between the device display D and the device control key pad P, whereby the optional crosswise stiffeners 223 is adapted to cooperate with the electronic device E.

According to another embodiment, the optional expanding mechanism 221 is configured as an optional hoop stiffener 224 formed as a thin and narrow hoop of a resiliently flexible spring material, such as of one of the spring materials discussed herein, or another suitable spring material. The hoop stiffener 224 is, for example, formed as a continuous loop having the same general shape as the peripheral sealing lip 218 and being only slightly smaller in length and width than the circumferential slot 220. The optional hoop stiffener 224 is, for example, coupled to the flexible window portion 182 of the membrane-type window panel 148 by being embedded or molded into the surface of the flexible window portion 182 in approximately the position occupied by the lengthwise and crosswise stiffeners 222, 223. Alternatively, the optional hoop stiffener 224 is coupled to the flexible window portion 182 of the membrane-type window panel 148 by adhesion onto the surface of the flexible window portion 182 using, for example, a suitable bonding agent such as RTV adhesive or another suitable adhesive. The optional hoop stiffener 224 is thereby spaced away from the center of the flexible window portion 182 in close proximity to the peripheral sealing lip 218 so as to be positioned outside the footprint of the device display D and the device control key pad P. Alternatively, the optional hoop stiffener 224 is coupled to the peripheral sealing lip 218, for example, by being molded into the surface of the peripheral sealing lip 218. The hoop stiffener 224 is, for example, positioned immediately inboard of the circumferential slot 220 to exert maximum expansive pressure on the sealing lip 218 to push the slot 220 into sealing contact with the circumferential ridge 219 on the inner periphery of the window aperture 113. The hoop stiffener 224 is optional positioned in the plane of the slot 220 so that moment or torque that could warp the peripheral sealing lip 218 is avoided.

The hoop stiffener 224 of the optional expanding mechanism 221 is sufficiently flexible to be temporarily bent or flexed without buckling during entry of the window panel 148 into the window aperture 113. Additionally, the hoop stiffener 224 is sufficiently resilient to straighten after entry of the window panel 148 into the window aperture 113 and to thereafter expand the circumferential slot 220 of the peripheral sealing lip 218 into sealing contact with the circumferential ridge 219 on the inner periphery of the window aperture 113.

The circumferential sealing mechanism 180 optionally includes one or both of the lengthwise and crosswise stiffeners 222, 223. Alternatively, the circumferential sealing mechanism 180 optionally includes the hoop stiffener 224. Optionally, the circumferential sealing mechanism 180 optionally includes the hoop stiffener 224 in combination with one or both of the lengthwise and crosswise stiffeners 222, 223.

Figure 22:
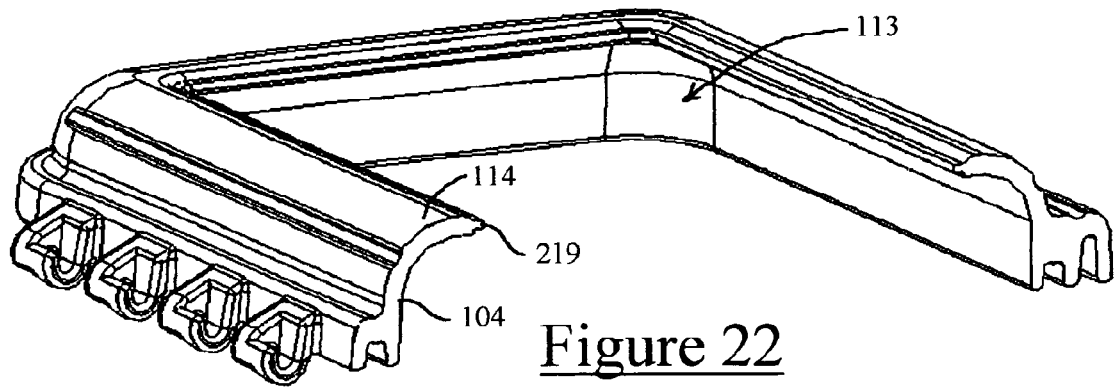
FIG. 22 is a cross-sectional view of the lid having the circumferential ridge formed on the inner periphery of the window in the plane of the window floor.

FIG. 22 is a cross-sectional view of the lid 104 having the circumferential ridge 219 formed on the inner periphery of the window aperture 113 in the plane of the window floor 114.

Figure 23:
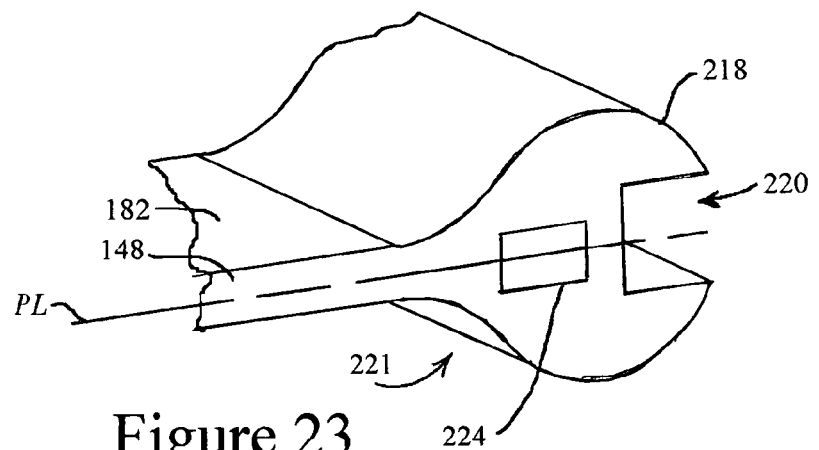
FIG. 23 is a close-up of the alternative embodiment of the substantially water-resistant circumferential sealing mechanism of the invention for the membrane-type panel having the peripheral seal portion of the invention being formed as a relatively enlarged lump or raised bump or swelling of the membrane material, and the circumferential groove being sized to engage the ridge portion of the inner periphery of the window.

FIG. 23 is a close-up of the alternative embodiment of the substantially water-resistant circumferential sealing mechanism 180 for the membrane-type window panel 148 having the peripheral sealing lip 218 being formed as a relatively enlarged lump or raised bump or swelling of the membrane material, and the circumferential slot 220 being sized to engage the ridge portion 219 of the inner periphery of the window aperture 113. The peripheral sealing lip 218 and circumferential slot 220 are shown, by example and without limitation, as being substantially symmetrical about the plane PL of the central flexible window portion 182. However, such symmetry is not required, and other mating shapes of the circumferential slot 220 and ridge portion 219 are also contemplated and can be substituted without deviating from the scope and intent of the present invention.

Figure 24:
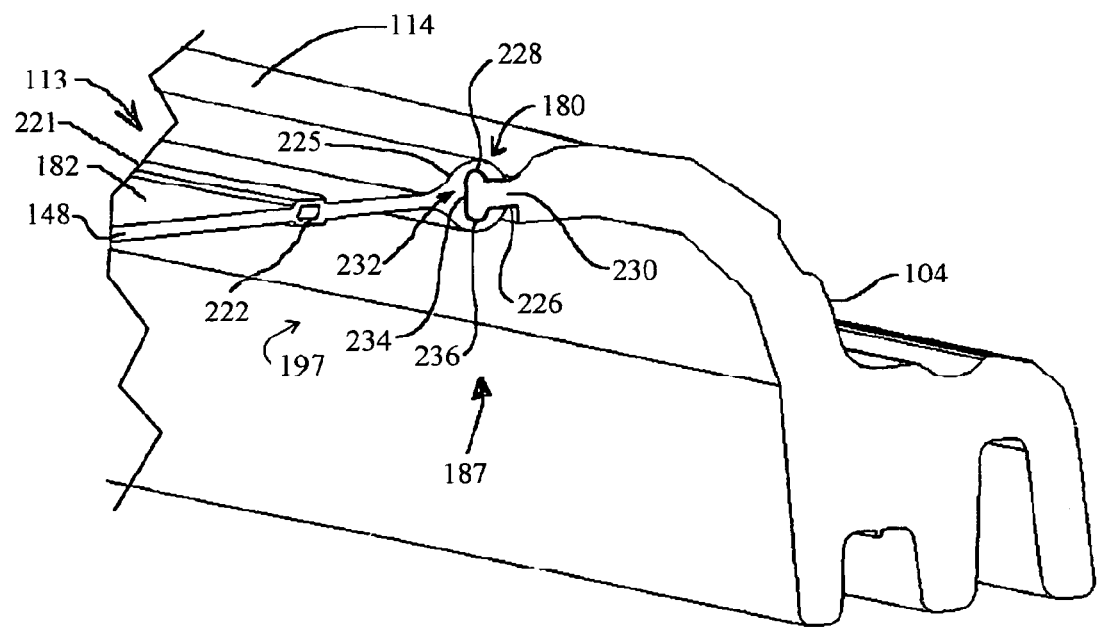
FIG. 24 is a close-up of another alternative embodiment of the substantially water-resistant circumferential sealing mechanism of the invention for the membrane-type panel having a peripheral seal portion of the invention of the membrane-type panel being formed as the relatively enlarged lump or raised bump or swelling of the membrane material of which the panel is formed.

FIG. 24 is a close-up of another alternative embodiment of the substantially water-resistant circumferential sealing mechanism 180 for the membrane-type window panel 148 having a continuous peripheral sealing lip 225 of the membrane-type window panel 148 being formed as the relatively increased thickness, such as an enlarged lump or raised bump or swelling of the membrane material of which the window panel 148 is formed. The peripheral sealing lip 225 surrounds and is integral with the central flexible window portion 182 of the window panel 148, and by example and without limitation, is formed symmetrically about the plane of the central flexible window portion 182. The flexible window portion 182 is slightly smaller in dimension than the window aperture 113 in the lid 104 with the peripheral sealing lip 225 interfacing with a circumferential ridge 226 formed on the inner periphery of the window aperture 113 in the plane of the window floor 114. The inner peripheral ridge portion 226 of the window aperture 113 is formed as a key with one or more circumferential protrusions or "teeth" 228 projected away from a main body 230 of the ridge 226 out of the plane of the window floor 114. The peripheral sealing lip 225 surrounding the flexible window portion 182 is slightly larger than the inner peripheral ridge portion 226 of the window aperture 113. The enlarged peripheral sealing lip 225 is formed with a circumferential groove 232 shown, by example and without limitation, as being in the plane of the central flexible window portion 182. The circumferential groove 232 is formed as a keyway having a circumferential slot 234 and one or more circumferential grooves 236. The circumferential slot 234 and grooves 236 are respectively sized to engage the main body 230 and the one or more circumferential teeth 228 of the ridge portion 226 of the inner periphery of the window aperture 113 under slight compression, with the relatively soft and pliable peripheral sealing lip 225 of the membrane-type window panel 148 spreading to receive both the main body 230 and the one or more circumferential teeth 228 of the rigid inner peripheral ridge 226.

When formed with the circumferential slot 234 and grooves 236, the circumferential sealing mechanism 180 optionally includes one or both of the lengthwise and crosswise stiffeners 222, 223. Alternatively, the circumferential sealing mechanism 180 optionally includes the hoop stiffener 224. Optionally, the circumferential sealing mechanism 180 optionally includes the hoop stiffener 224 in combination with one or both of the lengthwise and crosswise stiffeners 222, 223.

Figure 25:
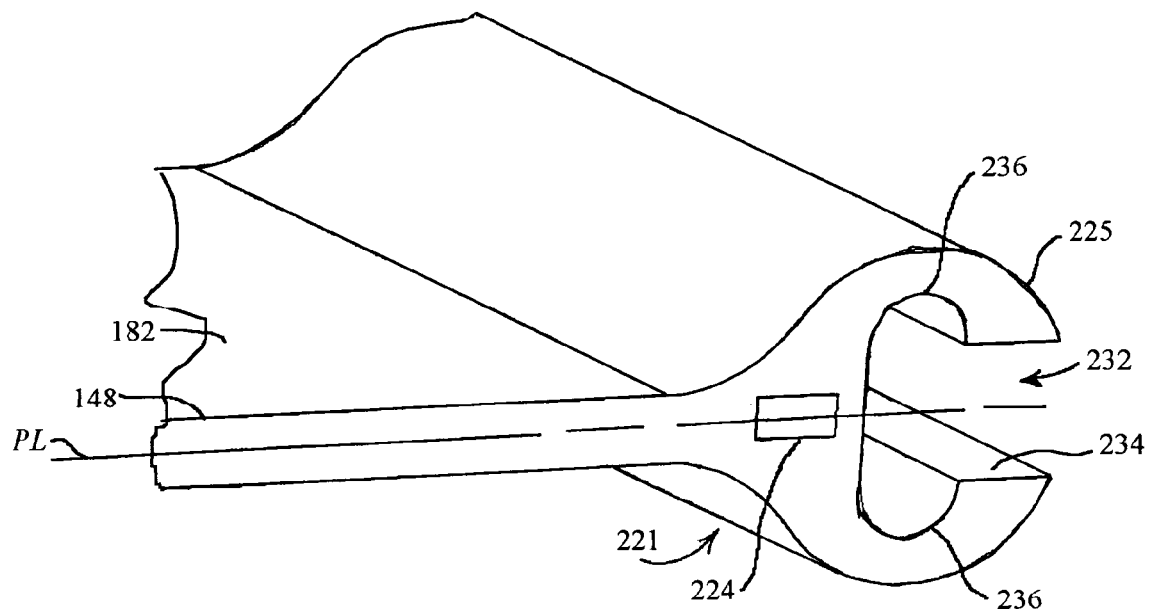
FIG. 25 is a close-up of the other alternative embodiment of the substantially water-resistant circumferential sealing mechanism of the invention for the membrane-type panel having the peripheral seal portion of the invention being formed as a relatively enlarged lump or raised bump or swelling of the membrane material, and the circumferential groove being formed with the circumferential slot and grooves sized to engage the circumferential protrusions of the ridge portion of the ridge portion formed on the inner periphery of the window.

FIG. 25 is a close-up of the other alternative embodiment of the substantially water-resistant circumferential sealing mechanism 180 for the membrane-type window panel 148 having the peripheral sealing lip 225 being formed as a relatively enlarged lump or raised bump or swelling of the membrane material, and the circumferential groove 232 being formed with the circumferential slot 234 and grooves 236 sized to engage the circumferential teeth 228 of the ridge portion 226 of the ridge portion 226 formed on the inner periphery of the window aperture 113.

Figure 26:
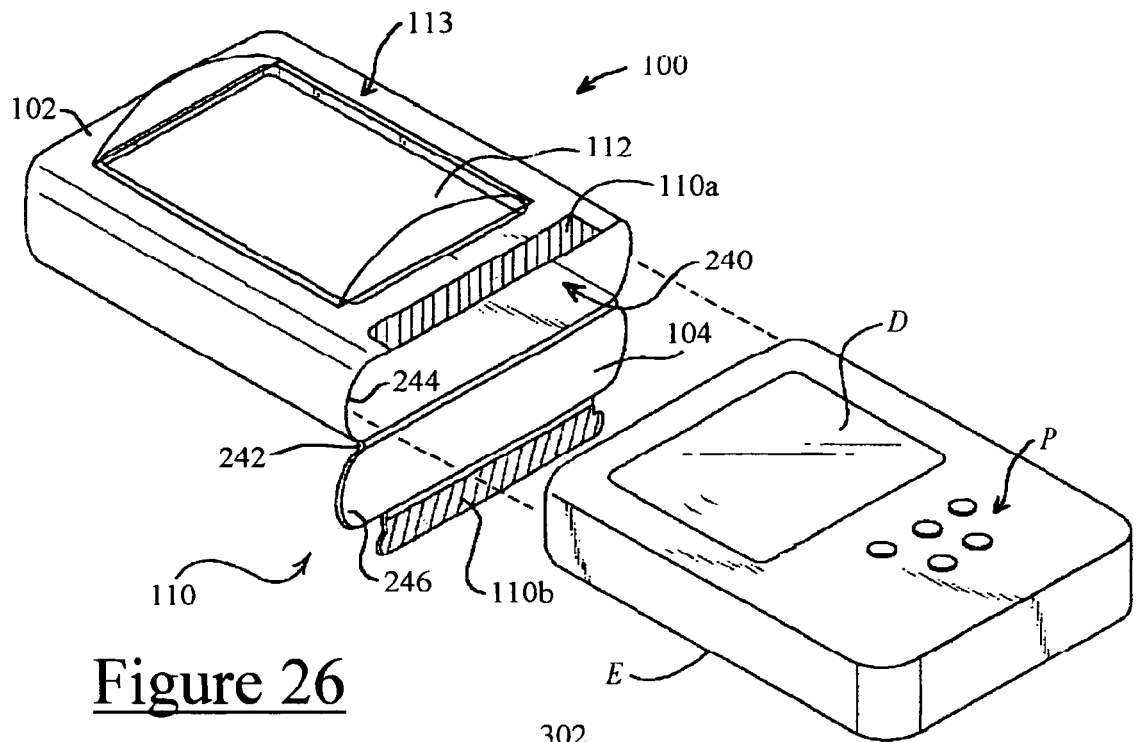
FIG. 26 is a perspective view of another alternative embodiment of the dry box of the invention having the container formed as a pocket that is sized and structured to receive a portable electronic device.

FIG. 26 is a perspective view of another alternative embodiment of the dry box 100 of the invention having the container 102 formed as a pocket that is sized and structured to receive the portable electronic device E. The lid 104 covers an opening 240 in one end of the container 102 and is hinged thereto along one coincident edge by any conventional hinge mechanism 242. When closed over the opening 240, the lid 104 is secured using any convenient latch mechanism 110. For example, the latch mechanism 110 is one of the latch mechanisms 110 disclosed herein, and optionally includes any of the circumferential seal mechanism 105 disclosed herein. Alternatively, the latch mechanism 110 is illustrated, by example and without limitation, as a hook and loop fastener system having first and second portions 110a, 110b on opposing portions of the container 102 and lid 104. When the electronic device E is installed in the dry box, the device display D is positioned behind the magnifier 112, which is any of the different magnification mechanisms described herein, including the optically transparent conventional convex lens, and the optically transparent Fresnel lens, or another magnification mechanism capable of enlarging the appearance of a display portion D by a desired percentage which makes information appearing on the display D appear larger, and therefore, easier to view. Furthermore, the window aperture 113 is optionally fitted with the combination viewing panel 178 that includes the optically transparent window panel 148 as a normal viewing portion in combination with the magnifier 112. Alternatively, the window aperture 113 is optionally fitted with the optically transparent normal-viewing window panel 148 formed as the thin optically transparent resiliently pliable membrane without magnification that operates as a normal viewing window for viewing the display D and simultaneously operates as a touch screen for operating the control key pad P of the portable electronic device E, wherein the magnifier 112 is provided as the one of the movable magnifiers 112 described herein that are movable relative to the window aperture 113 such that the optically transparent normal-viewing window panel 148 is accessible to the user. Accordingly, such alternatives are also contemplated and can be substituted without deviating from the scope and intent of the present invention.

As shown, the dry box 100 may not be completely weather tight, since the lid 104 may not completely seal the opening 240 in the end of the container 102. However, the dry box 100 is expected to be reasonably water-resistant when the sealing mechanism 105 is utilized between respective peripheral lip portions 244, 246 formed around the opening 240 and the lid 104.

Figure 27:
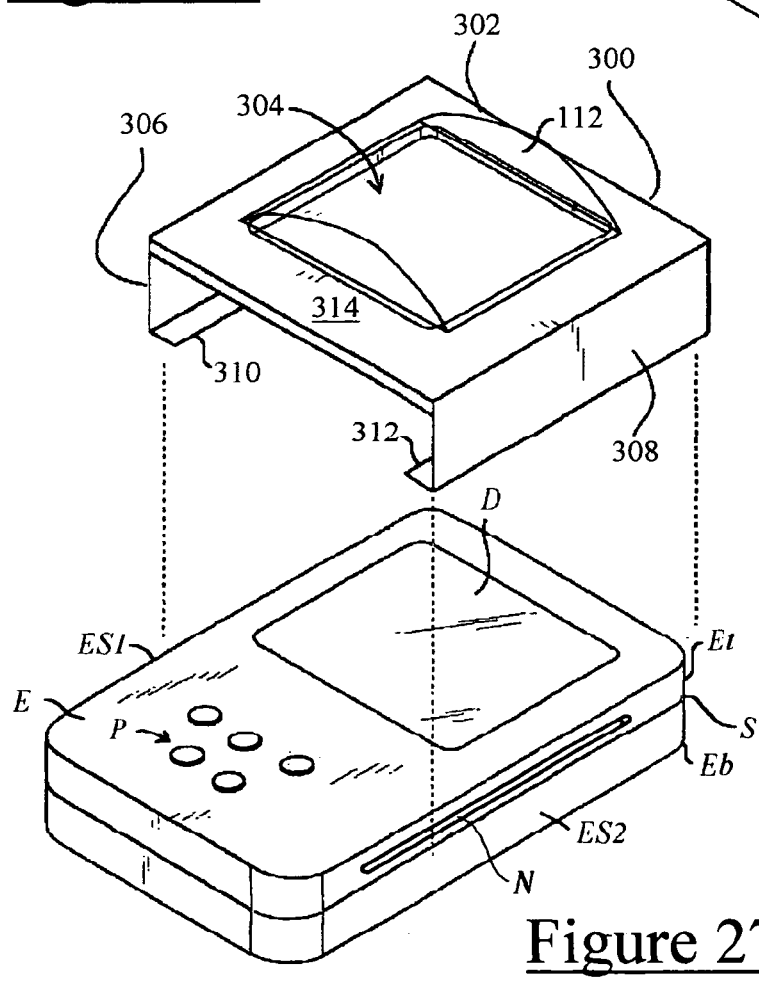
FIG. 27 is an illustration of another alternative embodiment of the present invention wherein a the magnifier is provided as part of a cover of the invention that is snapped over the portable electronic device with the magnifier positioned over the device display.

FIG. 27 is an illustration of another alternative embodiment of the present invention wherein a the magnifier 112 is provided as part of a cover mechanism 300 that is snapped over the portable electronic device E with the magnifier 112 positioned over the display D. The magnifier 112 resides on a top face 302 of the cover 300 over a window aperture 304 that is sized to permit viewing of the device display D through the top face 302 of the cover 300. A pair of opposing side wings 306, 308 project downward from the bottom face of the cover 300 opposite the magnifier 112. The side wings 306, 308 are resiliently pliable and snap over the opposing sides ES1, ES2 electronic device E. According to one embodiment of the invention, the side wings 306, 308 include matching tabs 310, 312 that couple with structure S of the formed in the opposing sides ES1, ES2 electronic device E for securely attaching the cover 300 to the electronic device E with the magnifier 112 arranged over the display D. For example, the structure S is a side slot found in many such portable electronic devices E between separable top and bottom covers Et, Eb. Accordingly, the tabs 310, 312 wedge into the side slot structure S as a simple attachment mechanism for securing the cover 300 to the portable electronic device E. The magnifier 112 is slidable onto and over the display D by a sliding engagement between the tabs 310, 312 and the side slot structure S. Accordingly, the magnifier 112 is slidable over the device control key pad P when the cover mechanism 300 is moved by sliding the tabs 310, 312 along the side slot structure S, whereby the user has a magnified view of the buttons.

Other conventional catch mechanisms are also contemplated and can be substituted without deviating from the scope and intent of the present invention. For example, device manufacturers provide many portable electronic devices E with the structure S a pair of notches N formed along the opposing device sides ES1, ES2 for securing the devices E in a holding bracket. As an alternative to wedging into a slot structure S, the tabs 310, 312 on the side wings 306, 308 fit into the notch structure N for attaching cover mechanism 300 to the portable electronic device E. The tabs 310, 312 may also be slidably engaged with the notch structure N and slidable along the structure.

The window aperture 113 is positioned over the device display D with the magnifier 112 there over for enlarging the appearance of a display portion D. For example, the magnifier 112 magnifies the display D about 150 percent or more when the cover 300 is positioned about arm's length from the user's face, but may be any desired magnification which makes information appearing on the display D appear larger, and therefore, easier to view. The magnifier 112 is any of the different magnification mechanisms described herein, including the optically transparent conventional convex lens, and the optically transparent Fresnel lens, or another magnification mechanism capable of enlarging the appearance of a display portion D by a desired percentage which makes information appearing on the display D appear larger, and therefore, easier to view.

The side wings 306, 308 of the cover mechanism 300 operate in combination with the tabs 310, 312 and the device side slot S or notches N to provide an offset mechanism 313 for offsetting the magnifier 112 at a selected distance from the display D that effectively focuses the magnifier 112 on the display D.

The cover mechanism 300 is formed with an overall length that ensures that, while the magnifier 112 covers the device display D, the bottom edge 314 is sized to clear the device control key pad P so the user can access and manipulate the buttons.

The magnifier 112 and the cover mechanism 300 may be coupled using any mechanism whereby the magnifier 112 can be secured to the cover 300. This includes snapping, clamping, fastening, sliding, gluing, adhering, or any other method for securing two components together.

Alternatively, the magnifier 112 is integral with the cover mechanism 300, both being formed of the optically transparent material of the magnifier 1112. For example, the magnifier 112 and cover 300 are both formed of glass, acrylic, plastic, or polycarbonate, or anther optically transparent material capable of being formed into an optical magnification mechanism. The length of the side wings 306, 308 is selected for spacing the magnifier 112 an appropriate distance from the display D when installed onto the electronic device E. The thickness of the side wings 306, 308 is selected to provide sufficient resilient flexibility to spread over the opposing sides ES1, ES2 electronic device E and clamp the matching tabs 310, 312 into the slot S between the separable top and bottom covers Et, Eb.

Figure 28:
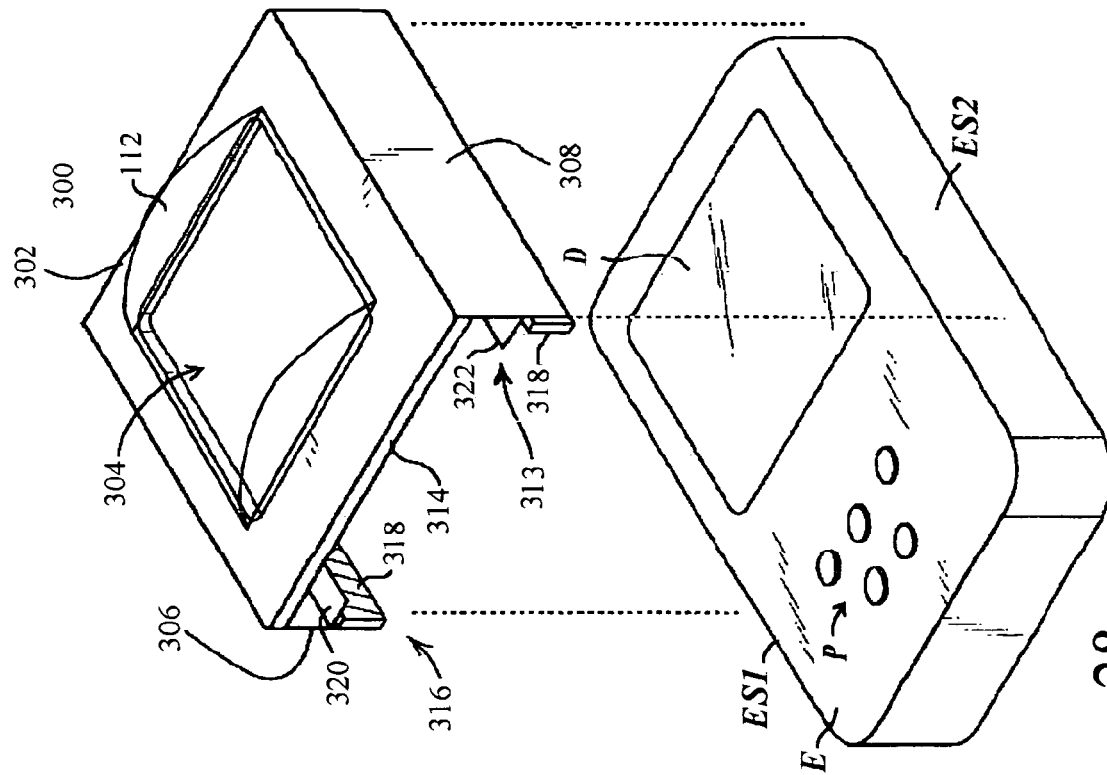
FIG. 28 illustrates another alternative means for securing the cover of the invention to the portable electronic device with the magnifier positioned over the device display.

FIG. 28 illustrates another alternative means for securing the cover mechanism 300 to the portable electronic device E with the magnifier 112 positioned over the display D. For example, each of the opposing side wings 306, 308 include a gripping mechanism 316. By example and without limitation, the gripping mechanism is embodied as a pair of resilient pads 318 formed on each of the opposing side wings 306, 308. The resilient pads 318 operate to grip the opposing sides ES1, ES2 electronic device E and clamp the cover mechanism 300 thereto. For example, the resilient pads 318 are elastomeric pads formed of PVC, rubber, or silicone sheet material, or another resilient elastomeric material having a high coefficient of surface friction for gripping the usually smooth sides ES1, ES2 electronic device E. The resilient pads 318 are adhered to the respective side wings 306, 308 of the cover 300 using, by example and without limitation, a RTV adhesive or another suitable adhesive, or a conventional PSA. Optionally, the side wings 306, 308 of the cover mechanism 300 include the offset mechanism 313 that is embodied, by example and without limitation, as a pair of stops 320, 322 that are projected inward of the respective wings 306, 308. The pair of stops 320, 322 are structured to engage the surface of the device top cover Et for offsetting the magnifier 112 at a selected distance from the display D that effectively focuses the magnifier 112 on the display D.

Figure 29:
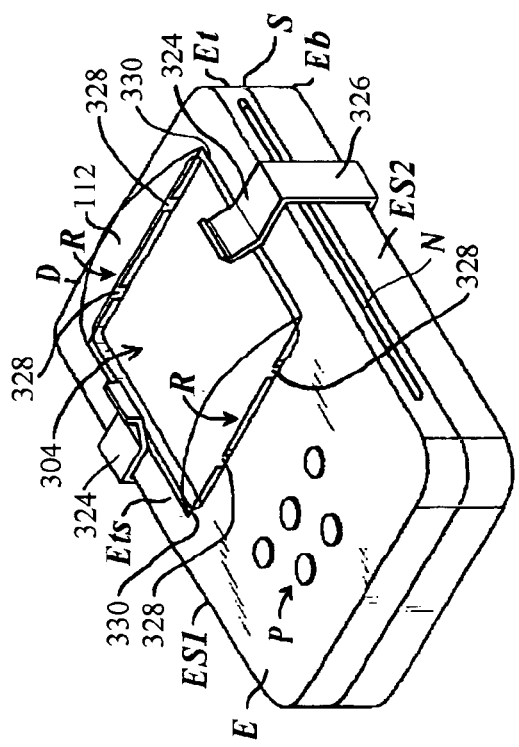
FIG. 29 illustrates an alternative embodiment of the magnifier of the invention that is structured for being attached to the electronic device in a position over the device display.

FIG. 29 illustrates an alternative embodiment of the magnifier 112 that is structured for being attached to the electronic device E in a position over the display D. The magnifier 112 is either fitted over the display D and attached to a top surface Ets of the electronic device E, or the magnifier 112 is integrated into the top surface Ets of the electronic device E and replaces the usual screen of the display D. The magnifier 112 is any of the different magnification mechanisms described herein, including the optically transparent conventional convex lens, and the optically transparent Fresnel lens, or another magnification mechanism capable of enlarging the appearance of a display portion D by a desired percentage which makes information appearing on the display D appear larger, and therefore, easier to view.

According to one embodiment of the invention, the magnifier 112 is adhered to the top surface Ets of the electronic device E using a suitable adhesive. Alternatively, one or more flexible clips 324 formed either on the top surface Ets of the electronic device E, or as part of a separate band 326 that fits around the electronic device E. Alternatively, the band 326 is an elastic band that is attached to opposite sides of the magnifier 112. According to one embodiment of the invention, the magnifier 112 is formed with one or more flexible clips 328 that extend from the magnifier 112 and clip the magnifier 112 into a relief R frequently formed in the top surface Ets of the electronic device E and outlining the display D. Other conventional mechanisms for either permanently or temporarily coupling the magnifier 112 to the electronic device E over the display D are similarly contemplated, including snapping, clamping, fastening, sliding, gluing, adhering, or any other method for securing two components together, and can be substituted without deviating from the scope and intent of the present invention. By example and without limitation, an adhesion bond 330 is formed between the magnifier 112 and the top surface Ets of the electronic device E using, for example, an RTV adhesive of the type discussed herein.

According to one embodiment of the invention, the Fresnel lens magnifier 112 formed of the thin resiliently pliable membrane that operates magnify the appearance of both the display D of the electronic device E. For example, the Fresnel lens magnifier 112 is a sheet of flexible magnifying plastic of a type that is discussed herein. As such, the plastic material of the Fresnel lens magnifier 112 is cut or otherwise formed to fit into the relief R in the top surface Ets of the electronic device E. When pressed against the surface of the device display D and air bubbles are squeeze out of the interface, the pliable membrane Fresnel lens magnifier 112 effectively adheres to the display D without either the flexible tabs 328 or an adhesive. Installation of the magnifier 112 is thus greatly simplified.

Figures 30, 31:
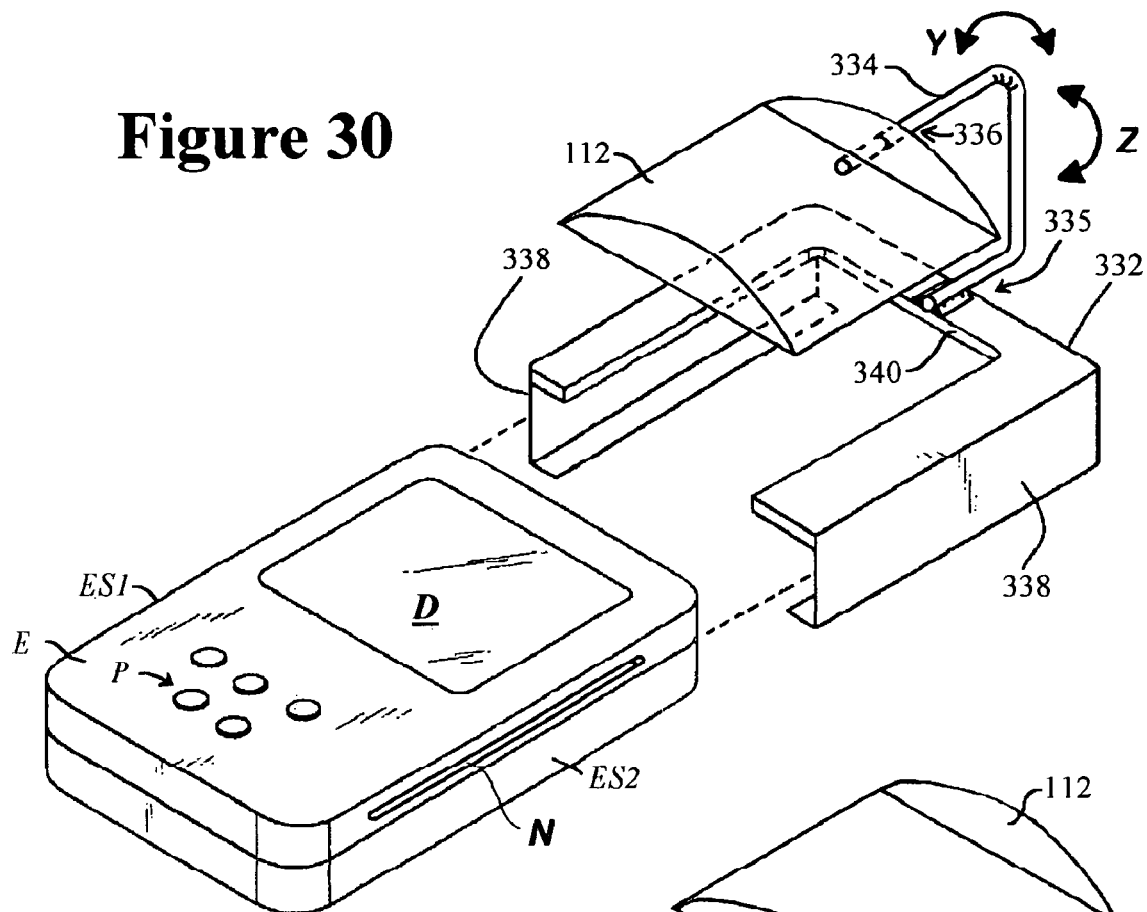
FIG. 30 illustrates another alternative embodiment of the magnifier of the invention that is structured for being attached to the electronic device in a position over the display.
FIG. 31 illustrates yet another alternative embodiment of the magnifier of the invention that is structured for being attached to the electronic device in a position over the display.

FIG. 30 illustrates another alternative embodiment of the magnifier 112 that is structured for being attached to the electronic device E in a position over the display D. The magnifier 112 is coupled to a bracket 332 by a permanently bendable rod 334, by example and without limitation, a permanently bendable aluminum rod of the type described by Richter in U.S. Pat. No. 6,032,910, "Flexible Support Arm for Supporting Objects," which is incorporated herein by reference. The permanently bendable rod 334 may be formed of another metal or a permanently bendable plastic, or twisted metal wires inside plastic of a type which is well-known in the art. A joint 335 couples the rod 334 to the bracket 332. For example, the rod 334 is bonded, soldered, welded, clamped, adhesively bonded or otherwise mechanically coupled by another known coupling method or device to the bracket 332 in a position that permits the magnifier 112 to be positioned over the display D of the electronic device E for viewing the display D having a magnified appearance.

The permanently bendable rod 334 is coupled to the magnifier 112, by example and without limitation, by adhesive bonding into an aperture 336 (shown in phantom) formed in the material of the magnifier 112, as shown. Other means for coupling the permanently bendable rod 334 to the magnifier 112 are also contemplated and can be substituted without deviating from the scope and intent of the present invention. For example, the permanently bendable rod 334 is alternatively bonded, soldered, welded, clamped, adhesively bonded or otherwise mechanically coupled to the magnifier 112 by another known coupling method or device.

The bracket 332 is optionally coupled to the device E by a pair of side wings snapping over the opposing sides ES1, ES2 of the device E and tabs 310, 312 wedging into the side slot structure S or into the notch structure N, as discussed in FIG. 27. Alternatively, the bracket 332 include side wings formed with the gripping mechanism 316 that grips the opposing sides ES1, ES2 electronic device E and clamp the bracket 332 thereto, as discussed in FIG. 28.

According to one embodiment of the bracket 332 of the invention, the bracket 332 includes a pair of "C" or "U"-shaped channels 338 slightly deeper than a thickness of the target device E and coupled together by a bridge 340 that spaces the channels 338 slightly wider than the width of the device E. Thus sized and spaced, the channels 338 slide over the body of the device E and engage with a sufficiently close fit as to be retained by the device E, yet loosely enough to be easily disengaged. Thus, the magnifier 112 is easily temporarily installed on the electronic device E and is easily arranged over the display D or displaced from its magnifying position.

The rod is optionally bent to displace the magnifier 112 from its position for magnifying the display D, such as when the user does not require or desire to view the magnified appearance. Accordingly, the rod 334 is bent upwardly away from the display D in the direction indicated by the arrow "Z," whereby the magnifier 112 is bendably displaced from its magnifying position. Alternatively, the rod 334 is twisted sideways relative to the display D in the direction indicated by the arrow "Y," whereby the magnifier 112 is also displaced from its magnifying position.

FIG. 31 illustrates yet another alternative embodiment of the magnifier 112 that is structured for being attached to the electronic device E in a position over the display D. The magnifier 112 is coupled to the electronic device E by a mechanical snap lock mechanism 342, by example and without limitation, a snap lock mechanism of the type disclosed by Soennichsen in U.S. Pat. No. 5,813,096, "Snap Fastener with a Safety Lock," or by Toth, Jr. U.S. Pat. No. 3,978,830, "Snap-on Spring Retainer Lock," which are both incorporated herein by reference. Other mechanical and magnetic snap lock mechanisms are generally well-known in the art and are also contemplated and can be substituted without deviating from the scope and intent of the present invention. For example, a magnetic snap lock mechanism of the type disclosed either by Bauer in U.S. Pat. No. 5,953,795, "Magnetic Snap Lock," or by Kaufman in U.S. Pat. No. 6,009,601, "Magnetic Snap Lock," or another magnetic snap lock mechanism can be substituted without deviating from the scope and intent of the present invention.

The magnifier 112 is coupled to a stiff metal or plastic shaft 344 having a resilient locking head 346. For example, the magnifier 112 is coupled to a head 348 (shown in phantom) of the shaft 344 opposite the locking head 346 by being adhered, soldered, welded, clamped, adhesively bonded or otherwise mechanically coupled by another known coupling method or device. The locking head 346 is structured to engage a mating retainer lock 350 that is coupled to the top surface Ets of the electronic device E in a position that permits the magnifier 112 to be positioned over the display D of the device E for viewing the display D having a magnified appearance by a joint 351 between a base 353 of the retainer lock 350 and the device top surface Ets, whereby the retainer lock 350 is adhered, soldered, welded, clamped, adhesively bonded or otherwise mechanically coupled by another known coupling method or device to the top surface Ets of the electronic device E. The shaft 344 is sized to cooperate with the retainer lock 350 offset the magnifier 112 at a selected distance from the display D that effectively focuses the magnifier 112 on the display D.

The resilient locking head 346 is formed, by example and without limitation, having a pair of resiliently flexible spaced-apart teeth 352 structured to compress for entering a mating aperture 354 in the mating retainer lock 350 with a light hand-pushing pressure, and similarly to compress for disengaging from the aperture 354. The magnifier 112 is thus detachable from the electronic device E. Therefore, when multiple mating retainer lock 350 are acquired and coupled to surfaces of other devices, including other electronic devices, the magnifier 112 is useable for viewing a magnified appearance of any device display or other object desired by the user.

The shaft 344 optionally includes a stabilizing mechanism 356 for stabilizing the magnifier 112 relative to the device E and display D. By example and without limitation, the stabilizing mechanism 356 is provided, by example and without limitation, by a collar 358 fixed on the shaft 344 adjacent to the locking head 346 at a distance that results in engagement with a top surface 360 of the retainer lock 350 when the locking head 346 is engaged with the retainer lock 350. Other stabilizing mechanisms are also contemplated and can be substituted without deviating from the scope and intent of the present invention.

The locking head 346 is substantially conical with the shaft 344 being substantially cylindrical such that the locking head 346 and shaft 344 are rotatable relative to the retainer lock 350. Accordingly, the locking head 346 and shaft 344 are rotatable about the longitudinal axis of the shaft 344 over the display D in the directions indicated by the arrows "+X" and "−X," whereby the magnifier 112 is rotatably placed into its magnifying position. Also, the locking head 346 and shaft 344 are rotatable away from the display D in the directions indicated by the arrows "+X" and "−X," whereby the magnifier 112 is rotatably displaced from its magnifying position.

The locking head 346 and retainer lock 350 are optionally formed with one or more mating flats 362, 364 that, when engaged, fix the relative rotational orientation of the locking head 346 to the retainer lock 350, whereby the magnifier 112 is rotationally fixed over the display D in its magnifying position.

Optionally, when engaged, the mating flats 362, 364 fix the magnifier 112 rotationally displaced from its magnifying position. The mating flats 362, 364 are optionally structured by a well-known method of relative sizing to permit a user to rotate the locking head 346 relative to the retainer lock 350 for rotatably placing the magnifier 112 into or displacing it from its magnifying position over the display D. According to one embodiment, a portion (indicated at 362) of the shaft 344 adjacent to the locking head 346 is square, rectangular, hexagonal, octagonal or another multi-sided shape and is matched by a cooperating shape in the mating aperture 354, whereby multiple mating flats 362, 364 are provided between the locking head 346 and the retainer lock 350. Thus, a light rotational force is required to rotate the locking head 346 relative to the mating aperture 354, whereby the magnifier 112 is fixed in a different rotational orientation with the display D.

Figure 32:
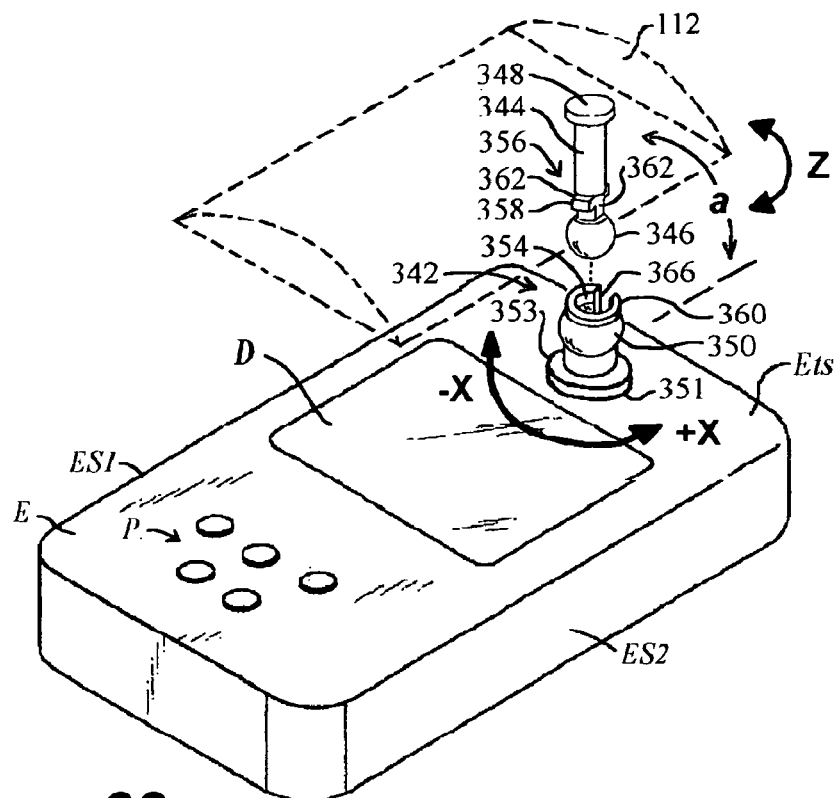
FIG. 32 illustrates a novel alternative embodiment of the mechanical snap lock mechanism, wherein the magnifier is shown in phantom to provide an unobstructed view of the snap lock mechanism.

FIG. 32 illustrates another alternative embodiment of the mechanical snap lock mechanism 342, wherein the magnifier 112 is shown in phantom to provide an unobstructed view of the snap lock mechanism 342 that the inventor believes is novel. Accordingly, by example and without limitation, the mechanical snap lock mechanism 342 is a snap lock mechanism structured for rotation about the longitudinal axis of the shaft 344 over the display D in the directions indicated by the arrows "+X" and "−X," whereby the magnifier 112 is rotatably placed into its magnifying position. Also, the mechanical snap lock mechanism 342 is rotatable away from the display D in the directions indicated by the arrows "+X" and "−X," whereby the magnifier 112 is rotatably displaced from its magnifying position. For example, the locking head 346 is formed as a ball with a part spherical exterior shape, and the mating aperture 354 of the retainer lock 350 is formed as a cooperating socket with a part spherical interior cavity (indicated at 354). The outer shell or exterior surface (indicated at 350) of the retainer lock 350 is illustrated having a part spherical shape merely to emphasize the part spherical shape of the interior cavity of the mating aperture 354. In practice, the outer shell or exterior surface of the retainer lock 350 is expected to have a cylindrical shape for ease of manufacturing. The ball locking head 346 is sized the same or slightly larger than the part spherical interior cavity of the mating aperture 354 such that, when installed in the mating aperture 354, the ball locking head 346 exerts a light expansive force on the surrounding mating aperture 354. The expansive force exerted by the ball locking head 346 results in a frictional engagement between the ball locking head 346 and the surrounding mating aperture 354, whereby the ball locking head 346 is rotationally fixed relative to the surrounding mating aperture 354, and a light rotational force is required to rotate the ball locking head 346 relative to the mating aperture 354.

A slot 366 is formed in the wall surface of the retainer lock 350 and cutting into the part spherical interior cavity of the mating aperture 354. The slot 366 permits the mating aperture 354 to spread to admit the ball locking head 346 through a mouth or opening (also indicated at 354) into the mating aperture 354 that is smaller than the interior cavity of the mating aperture 354 and, consequently, smaller than the ball locking head 346. The retainer lock 350 is manufactured of a resiliently elastic material, such as plastic, whereby the slot 366 closes and the part spherical interior cavity of the mating aperture 354 returns substantially to its pre-engagement condition after the ball locking head 346 is entered into and engaged with the mating retainer lock 350. Thus, the ball locking head 346 is engaged with the retainer lock 350 using a light hand-pushing pressure. Similarly, the slot 366 and for disengaging the ball locking head 346 from the aperture 354.

The collar 358 of the stabilizing mechanism 356 is fixed on the shaft 344 adjacent to the locking head 346 at a distance that results in engagement with the top surface 360 of the retainer lock 350 when the locking head 346 is engaged with the retainer lock 350. Other stabilizing mechanisms are also contemplated and can be substituted without deviating from the scope and intent of the present invention.

The collar 358 and the shaft 344 between the collar 358 and the ball locking head 346 are both formed with flats 362 that remove portions on opposing sides of the collar 358 and shaft 344. The remaining collar and shaft material is thus formed with the flats 362 that are sized to fit into the slot 366 in the retainer lock 350. The flats 362 permit the shaft 344 to enter into the slot 366 such that, when the locking head 346 is rotated within the retainer lock 350, the shaft 344 is swiveled by an angle "α" in the away from the display D in the direction indicated by the arrow "Z," whereby the magnifier 112 is displaced by swiveling from its magnifying position. According to one embodiment of the invention, the slot 366 is deep enough to permit the shaft 344 to swivel to a swivel angle α of 90 degrees or more, whereby the magnifier 112 is swiveled completely clear of the device display D. Alternatively, the slot 366 is relatively shallow, whereby the shaft 366 is restricted to a swivel angle α of about 30 to 45 degrees. According to one embodiment, the collar 358 collides with and operates against a surface of the outer shell or exterior surface (indicated at 350) of the retainer lock 350 between the slot 366 and the retainer lock base 353, such that the shaft 344 does not encounter the extreme end (not visible) of the slot 366 distal from the mouth or opening (indicated at 354) into the mating aperture 354. According to one embodiment, the slot 366 and shaft 344 are relatively sized to fit snugly together such that a friction force is generated between them during the swiveling operation, whereby a light hand-pushing pressure is used to swivel the shaft 344 through the slot 366. Alternatively, the slot 366 and shaft 344 are relatively sized to fit loosely together such that little or no effort is required to swivel the shaft 344 through the slot 366. Accordingly, the slight flick of a finger is used to swivel the shaft 344 through the slot 366, whereby the magnifier 112 is swiveled into its magnifying position or swiveled out of its magnifying position.

Figure 33:
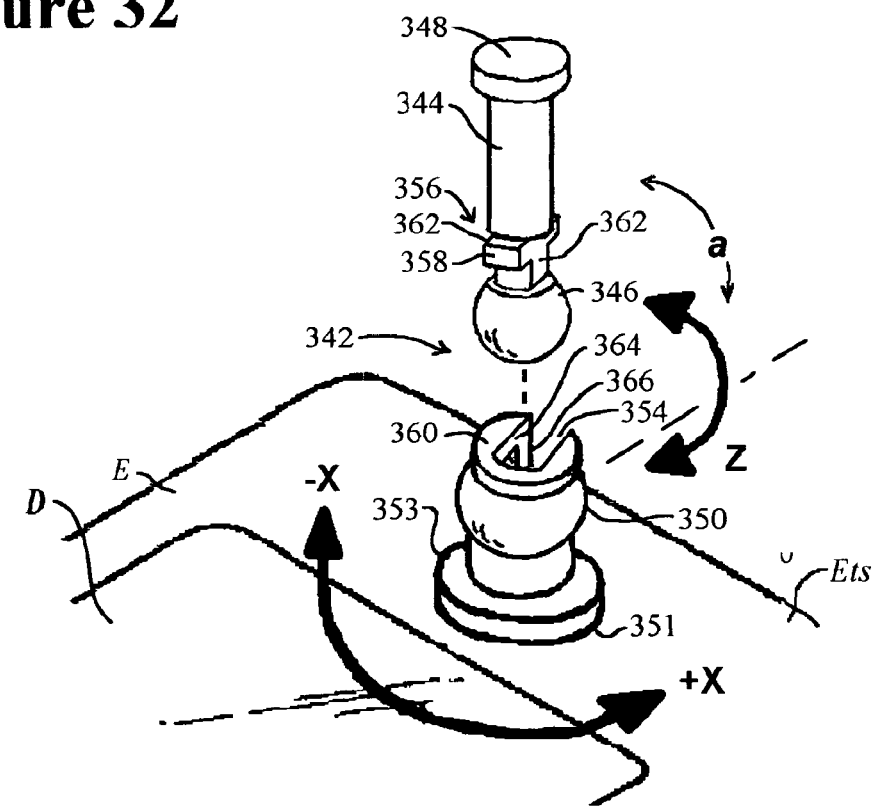
FIG. 33 is a close-up view a variation of the novel mechanical snap lock mechanism illustrated in FIG. 32, wherein the magnifier is removed for clarity.

FIG. 33 is a close-up view a variation of the novel mechanical snap lock mechanism 342 illustrated in FIG. 32 with the magnifier 112 removed for clarity. The mouth or opening (indicated at 354) into the mating aperture 354 of the retainer lock 350 is formed with one or more flats 364 that mate with the flats 362 on the shaft 344. The mating flats 362, 364, when engaged, fix the relative rotational orientation of the ball locking head 346 to the retainer lock 350, whereby the magnifier 112 is rotationally fixed over the display D in its magnifying position.

Optionally, when engaged, the mating flats 362, 364 fix the magnifier 112 rotationally displaced from its magnifying position. The mating flats 362, 364 are optionally structured by a well-known method of relative sizing to permit a user to rotate the locking head 346 relative to the retainer lock 350 for rotatably placing the magnifier 112 into or displacing it from its magnifying position over the display D. According to one embodiment, a portion (indicated at 362) of the shaft 344 adjacent to the locking head 346 is square, rectangular, hexagonal, octagonal or another multi-sided shape and is matched by a cooperating shape in the mouth or opening of the mating aperture 354, whereby multiple mating flats 362, 364 are provided between the locking head 346 and the retainer lock 350. Thus, a light rotational force is required to rotate the ball locking head 346 relative to the mating aperture 354, even when the ball locking head 346 is sized smaller than the part spherical interior cavity of the mating aperture 354 such that the ball locking head 346 is otherwise easily rotatable within the mating aperture 354. Thus, the magnifier 112 is fixed in a different rotational orientation with the display D.

While the preferred embodiment of the invention has been illustrated and described, it will be appreciated that various changes can be made therein without departing from the spirit and scope of the invention. For example, the different mechanism disclosed herein are optionally combined in different ways to achieve similar results in different embodiments of the invention. In one specific example, the embodiment of the invention illustrated in FIG. 30 is easily combined with the mechanical and magnetic snap lock mechanisms taught in the embodiment disclosed in FIG. 31, such that the permanently bendable rod 334 is modified to be coupled to a bracket 332 by one of the mechanical and magnetic snap lock mechanisms by modifying the rod 334 to include the locking head 346 and modifying the bracket 332 to include the retainer lock 350. Alternatively, the permanently bendable rod 334 is substituted in the embodiment of FIG. 31 for the shaft 344 and again is modified to include the locking head 346 for mating with the retainer lock 350 coupled directly to the electronic device E. Therefore, the inventor makes the following claims.

What is claimed is:

1. An electronic device storage box, the storage box comprising:
    a first cover having structure for securing a normally handheld portable electronic device therein and oriented with a display and a control key pad portions of the electronic device facing toward an opening in the first cover;
    a second cover having a first window aperture positioned in viewing relationship with an interior portion of the second cover, and further comprising an optical magnification mechanism positioned in viewing relationship to the first window aperture for viewing the interior portion of the second cover there through;
    an aperture in one of the first and second covers and communicating with the interior portion of the second cover and further comprising a knock-out plug formed therein; and
    a latch mechanism for securing the second cover relative to the opening in the first cover with the magnification mechanism arranged in a viewing relationship with the opening in the first cover.

2. The storage box of claim 1 wherein the first and second covers are further arranged in a mutually hinged relationship.

3. The storage box of claim 1, further comprising a substantially water-resistant circumferential seal mechanism arranged between the second cover and the opening in the first cover.

4. The storage box of claim 1 wherein the magnification mechanism is further arranged in a sliding relationship with the second cover.

5. The storage box of claim 1 wherein the magnification mechanism is further arranged in a hinged relationship with the second cover.

6. The storage box of claim 1 wherein the second cover is structured with a window aperture positioned for viewing an interior portion of the second cover there through; and
    further comprising a substantially water-resistant circumferential sealing mechanism arranged between the optically transparent resiliently pliable membrane and the window aperture of the second cover, the sealing mechanism comprising:
        a peripheral swelling formed integrally with a relatively thinner central portion structured for viewing an interior portion of the second cover there through, the peripheral swelling being larger than the window aperture; and
        a clamping mechanism structured for clamping the peripheral swelling of the membrane tightly against a surface of the second cover surrounding the window aperture.

7. The storage box of claim 1 wherein the second cover is structured with a window aperture positioned for viewing an interior portion of the second cover there through, and being structured with a circumferential ridge formed on an inner peripheral surface of the window aperture and extending into the window aperture; and
    further comprising a substantially water-resistant circumferential sealing mechanism arranged between the optically transparent resiliently pliable membrane and the window aperture of the second cover, the sealing mechanism comprising a peripheral swelling formed integrally with a relatively thinner central portion structured for viewing an interior portion of the second cover there through, the peripheral swelling being thicker than the circumferential ridge formed on the inner peripheral surface of the window aperture, and being structured with a circumferential groove sized to engage the circumferential ridge formed on the inner peripheral surface of the window aperture under compression.

8. The storage box of claim 1 wherein the first cover further comprises the aperture, and further comprises a groove formed peripherally of the knock-out plug formed therein.

9. The storage box of claim 8 wherein the first cover further comprises a floor portion opposite from the opening thereof, the floor portion further comprising the aperture having the knock-out plug formed therein surrounded by the groove formed peripherally thereof 10. The storage box of claim 9 wherein the floor portion of the first cover further comprises a well having the knock-out plug formed therein.

11. An electronic device storage box, the storage box comprising:
    first and second mating covers mutually rotatable along corresponding edges and forming a cavity structured to contain a normally handheld portable electronic device therein, one of the first and second covers being formed with a first window aperture positioned for viewing the cavity formed by the first and second covers, and one of the first and second covers being formed with a second electrical connection aperture through a floor portion thereof and communicating with the cavity and further comprising a knock-out plug formed therein in a substantially sealed relationship therewith and with a groove formed peripherally thereof;
    an optical magnifying lens coupled in viewing relationship with the window aperture; and
    a latch mechanism structured for securing the first and second covers in a substantially sealed relationship.

12. The storage box of claim 11 wherein the magnifying lens is integral with window aperture.

13. The storage box of claim 11 wherein the magnifying lens is movable relative to the window aperture.

14. The storage box of claim 11, further comprising an optically transparent window panel coupled in viewing relationship with the window aperture.

15. The storage box of claim 14 wherein the optically transparent window panel is formed of a optically transparent resiliently pliable membrane coupled to the window aperture in a substantially sealed relationship.

16. The storage box of claim 11 wherein one of the first and second covers further comprises a receiver structured for securing to an external presentation apparatus, the receiver further comprising a well formed substantially centrally thereof and having the aperture and knock-out plug formed therein.

17. An electronic device storage box, the storage box comprising:
    first and second mating covers mutually hinged along corresponding edges and forming a cavity structured to contain a normally handheld portable electronic device therein, each of the first and second covers being formed with a lip portion peripheral to an opening thereinto, the first cover being formed with a window aperture formed in a floor portion thereof and positioned for viewing the cavity formed by the first and second covers, and the second cover further comprising a floor portion being formed with a receiver structure on an external surface thereof and an aperture communicating with the cavity therethrough with a knock-out plug formed therein;
    an optical magnifier coupled to an external surface of the cover that is formed with the window aperture formed in a floor portion thereof, the optical magnifier being positionable relative to the window aperture for optically magnifying a view of the cavity;

a latch mechanism structured for clamping together the respective peripheral lip portions of the first and second covers; and a substantially water-resistant circumferential seal mechanism positioned between respective peripheral lip portions of the first and second covers.

18. The storage box of claim 17 wherein the optical magnifier is integral with window aperture.

19. The storage box of claim 17 wherein the optical magnifier is movable relative to the window aperture.

20. The storage box of claim 17, further comprising an optically transparent window panel coupled in a substantially water-resistant sealed relationship with the window aperture.

* * * * *